US010886077B2

(12) United States Patent
Park et al.

(10) Patent No.: US 10,886,077 B2
(45) Date of Patent: Jan. 5, 2021

(54) MOBILE TERMINAL

(71) Applicant: LG ELECTRONICS INC., Seoul (KR)

(72) Inventors: Bokyong Park, Seoul (KR); Changyong Jang, Seoul (KR); Gihwan Kim, Seoul (KR); Jinhwan Lee, Seoul (KR); Chalkee Jung, Seoul (KR); Euigeon Lee, Seoul (KR); Dongjun Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/345,031

(22) PCT Filed: Dec. 28, 2016

(86) PCT No.: PCT/KR2016/015437
§ 371 (c)(1),
(2) Date: Apr. 25, 2019

(87) PCT Pub. No.: WO2018/084374
PCT Pub. Date: May 11, 2018

(65) Prior Publication Data
US 2019/0295788 A1 Sep. 26, 2019

(30) Foreign Application Priority Data

Nov. 4, 2016 (KR) .................. 10-2016-0146803
Dec. 23, 2016 (KR) .................. 10-2016-0178319

(51) Int. Cl.
*H01H 13/16* (2006.01)
*H01H 13/06* (2006.01)
(Continued)

(52) U.S. Cl.
CPC ............ *H01H 13/06* (2013.01); *H01H 13/86* (2013.01); *H04M 1/02* (2013.01); *H04M 1/18* (2013.01);
(Continued)

(58) Field of Classification Search
CPC ...... H01H 13/06; H01H 13/063; H01H 13/86; H01H 2223/002
See application file for complete search history.

(56) References Cited

U.S. PATENT DOCUMENTS 7,355,137 B2 * 4/2008 Kawasaki .............. H01H 13/86
200/302.1
8,378,244 B2 * 2/2013 Xiao ..................... H04M 1/236
200/302.2

(Continued)

FOREIGN PATENT DOCUMENTS

JP          11-224557 A      8/1999
JP          2013-45600 A     3/2013
(Continued)

*Primary Examiner* — Felix O Figueroa
(74) *Attorney, Agent, or Firm* — Birch, Stewart, Kolasch & Birch, LLP

(57) ABSTRACT

A mobile terminal having a terminal main body including a front case forming an internal area including a submergence area into which water is introduced and a waterproof area into which water is blocked from being introduced, and an internal frame; a first unit including a key module mounted in the terminal main body, and generating a control command when a pressing occurs, the key module being positioned in the submergence area and moving due to an external force; a second unit positioned in the waterproof area, and when the pressing occurs, generates a signal; an elastic deformation layer of which a portion is elastically deformed due to movement of the first unit, so the second unit is pressed by the first unit; and a waterproof layer attaching the elastic deformation layer and the front case so
(Continued)

partitioning results in the submergence area and the waterproof area.

9 Claims, 20 Drawing Sheets

(51) Int. Cl.
　　　*H01H 13/86*　　(2006.01)
　　　*H04M 1/18*　　(2006.01)
　　　*H04M 1/02*　　(2006.01)
　　　*H04M 1/23*　　(2006.01)

(52) U.S. Cl.
　　　CPC ........ *H04M 1/23* (2013.01); *H01H 2221/002* (2013.01); *H01H 2221/006* (2013.01); *H01H 2223/002* (2013.01)

(56) References Cited

U.S. PATENT DOCUMENTS

| | | | |
|---|---|---|---|
| 8,519,286 B1 * | 8/2013 | Bloch | G06F 3/044 200/302.2 |
| 9,299,510 B2 * | 3/2016 | Cheong | H01H 13/06 |

FOREIGN PATENT DOCUMENTS

| | | |
|---|---|---|
| JP | 2014-135179 A | 7/2014 |
| JP | 2014-192540 A | 10/2014 |
| KR | 10-0755178 B1 | 9/2007 |

* cited by examiner

MOBILE TERMINAL

CROSS REFERENCE TO RELATED APPLICATIONS

This application is the National Phase of PCT/KR2016/015437 filed on Dec. 28, 2016, which claims priority under 35 U.S.C. § 119(a) to Patent Application Nos. 10-2016-0146803 and 10-2016-0178319 filed in Republic of Korea on Nov. 4, 2016 and Dec. 23, 2016, respectively, all of which are hereby expressly incorporated by reference into the present application.

TECHNICAL FIELD

The present invention relates to a mobile terminal with a waterproof structure, which is capable of being used in a state of being submerged in water.

BACKGROUND ART

Terminals may be divided into mobile/portable terminals and stationary terminals according to mobility. Also, the mobile terminals may be classified into handheld types and vehicle mount types according to whether or not a user can directly carry.

The terminal has various functions according to development of technologies. For example, a mobile terminal can be allowed to capture still images or moving images, play music or video files, play games, receive broadcast and the like, so as to be implemented as an integrated multimedia player. Efforts are ongoing to support and increase the functionality of terminals. Such efforts include software improvements, as well as changes and improvements in the structural components.

In recent years, with advances in waterproofing functions of mobile terminals, waterproof structures for blocking water from being introduced have been under development. Particularly, in a case where a pressing key that is pressed due to an external force is mounted on the outside of a terminal, while a structure in which pressing occurs due to the external force is maintained, a waterproof structure, as a structure in which pressing occurs due to an external force, has been proposed in which water is prevented from being introduced into an area where pressing keys are mounted. However, processes of assembling and disassembling a pressing key in the waterproof structure are complicated, and there is a likelihood that damage to the waterproof structure will occur during fabrication. In addition, there is a disadvantage that an amount of feeling of pressibility decreases.

DISCLOSURE OF THE INVENTION

Therefore, to obviate those problem, an aspect of the detail description is to provide a mobile terminal that employs, as a waterproof structure, a pressing to key structure for improving a feeling of pressibility and the ease with which assembling is performed.

To achieve these and other advantages and in accordance with the purpose of this specification, as embodied and broadly described herein, there is provided a mobile terminal including: a terminal main body that includes a front case which forms an internal area that includes a submergence (inundation) area into which water is introduced and a waterproof area into which water is blocked from being introduced, and an internal frame; a first unit that includes a key module which is mounted in the terminal main body and, when pressing occurs, generates a control command, the key module being positioned in the submergence area and moving due to an external force; a second unit that is positioned in the waterproof area and, when the pressing occurs, generates a signal; an elastic deformation layer of which a portion is elastically deformed due to movement of the first unit, in such a manner that the second unit is pressed by the first unit; and a waterproof layer that attaches the elastic deformation layer and the front case in such a manner that partitioning results in the submergence area and the waterproof area, and that includes a through hole through which the first unit passes.

In the mobile terminal, the first unit may be mounted on an external surface of the front case on which a rear surface cover is mounted, the waterproof layer and the elastic deformation layer may be mounted on an internal surface of the front case, and the second unit may be mounted on the internal surface of the front case in such a manner that as to cover the elastic deformation layer. As a result, water can be introduced through the elastic deformation layer.

In the mobile terminal, the metal key, the fixation lever, and the key bracket may be mounted on the front case, and the pressing portion may pass through the front case and may be brought into contact with the elastic deformation layer. As a result, the metal key, the fixation lever, and the key bracket are fixed readily, and water that is introduced between the front case and the metal key is blocked from flowing.

The mobile terminal may further an internal frame that is mounted on the front case and supports at least one electronic component; and a rear surface cover that covers the internal frame, is coupled to the front case, and includes a key hole, in which the fixation lever to which the metal key is fixed may be positioned in such a manner that the metal key passes through the key hole. As a result, the metal key, the fixation lever, and the key bracket are fixed readily, and water that is introduced through the front case and the internal frame is blocked from flowing.

Advantageous Effect

According to the present invention, a second unit that has the likelihood of being damaged due to water is waterproofed with a waterproof layer and an elastic deformation layer, and a first unit that includes a metal key which is exposed to the outside and is pressed by a user is mounted on a front case or an external surface of a rear surface cover in an inserted manner. Thus, a waterproof structure is realized, and assembling convenience is improved.

In addition, a hole is formed in the waterproof layer, and a groove is formed in the elastic deformation layer. Thus, the elastic deformation layer is deformed readily due to movement of the first unit, and an amount of feeling of the pressibility can be prevented from being decreased.

In addition, in first and second internal spaces that are formed in the front case in a manner that faces each other, the first and second units are assembled. Thus, an additional structure, such as a hole or a protrusion, is not formed on a stable-reaching surface for attaching a window. Therefore, the window reaches stably, and a waterproof effect can also be improved.

MODES FOR CARRYING OUT THE PREFERRED EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
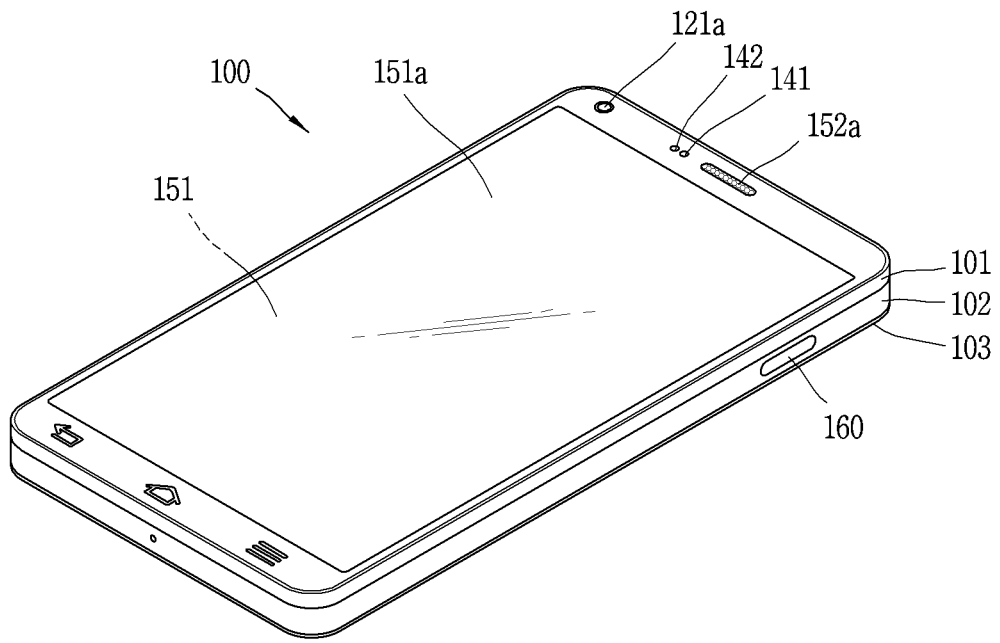
FIGS. 1A and 1B are diagrams of a mobile terminal according to an embodiment of the present invention, when views from different directions.
Figure 1B:
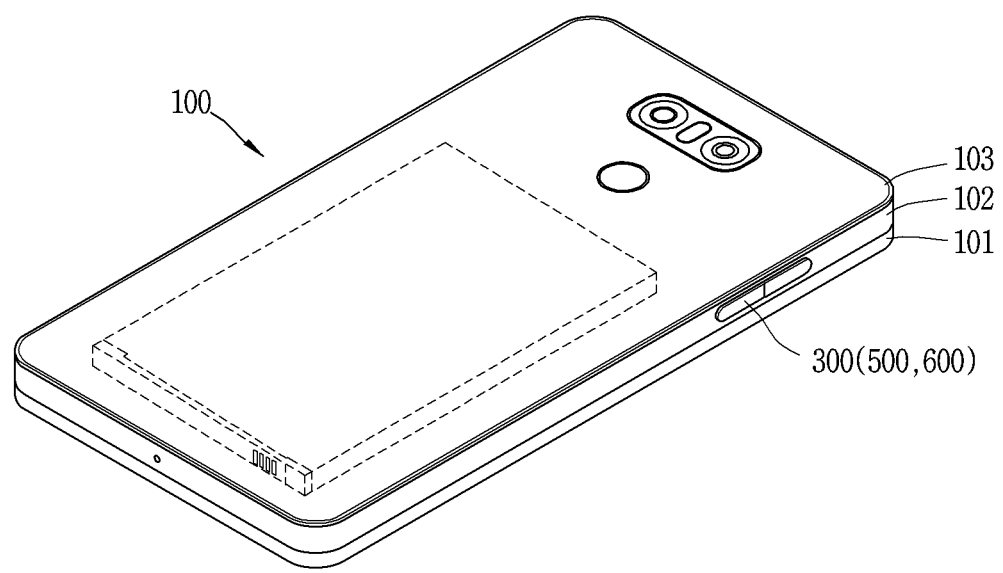

FIGS. 1A and 1B are views of a mobile terminal according to one embodiment of the present invention, viewed from different directions.

The mobile terminal 100 includes a bar-like terminal body. However, the mobile terminal 100 may alternatively be implemented in any of a variety of different configurations. Examples of such configurations include watch type, clip-type, glasses-type, or a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally be applied to other types of mobile terminals as well.

Here, considering the mobile terminal 100 as at least one assembly, the terminal body may be understood as a conception referring to the assembly.

The mobile terminal 100 will generally include a case (for example, frame, housing, cover, and the like) forming the appearance of the terminal. In this embodiment, the case is formed using a front case 101 and a rear case 102. Various electronic components are interposed into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101. The display unit 151 includes a display module 151b (see FIG. 2A) for outputting visual information.

In some embodiments, electronic components may also be mounted to the rear case 102. Examples of such electronic components include a detachable battery 191, an identification module, a memory card, and the like. In this case, a rear cover 103 is shown covering the electronic components, and this cover may be detachably coupled to the rear case 102. Therefore, when the rear cover 103 is detached from the rear case 102, the electronic components mounted on the rear case 102 are exposed to the outside.

As illustrated, when the rear cover 103 is coupled to the rear case 102, a side surface of the rear case 102 may partially be exposed. In some cases, upon the coupling, the rear case 102 may also be completely shielded by the rear cover 103. Meanwhile, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this case, a mobile terminal 100 having a uni-body is formed in such a manner that synthetic resin or metal extends from a side surface to a rear surface.

Meanwhile, the mobile terminal 100 may include a water-proofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

A display unit 151 may be disposed on a front surface of the terminal body 100 and key modules 300, 500, and 600 may be provided on side surfaces of the terminal body. The key modules 300, 500, and 600 are examples of the user input unit, which may be manipulated by a user to provide input to the mobile terminal 100. The key modules 300, 500, and 600 may also be commonly referred to as a manipulating portion. The key modules 300, 500, and 600 are implemented in a tactile manner, such as pushing or scrolling, such that the user can feel the input.

Figure 2A:
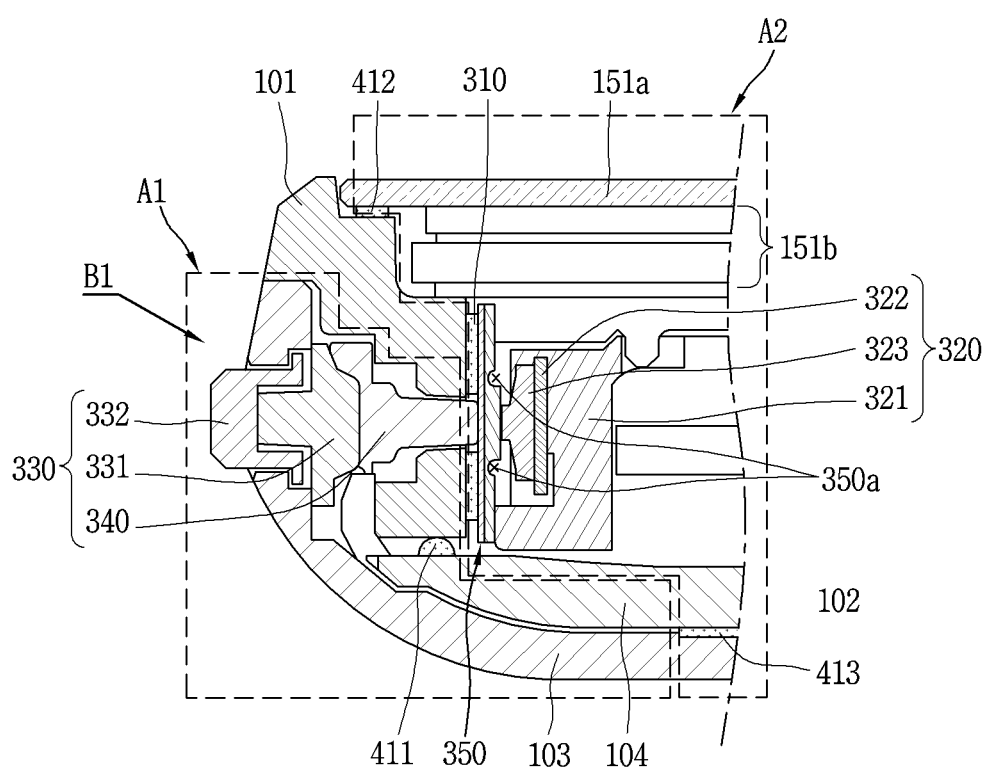
FIG. 2A is a cross-sectional diagram of the mobile terminal, taken along line A-A in FIG. 1B.
Figure 3:
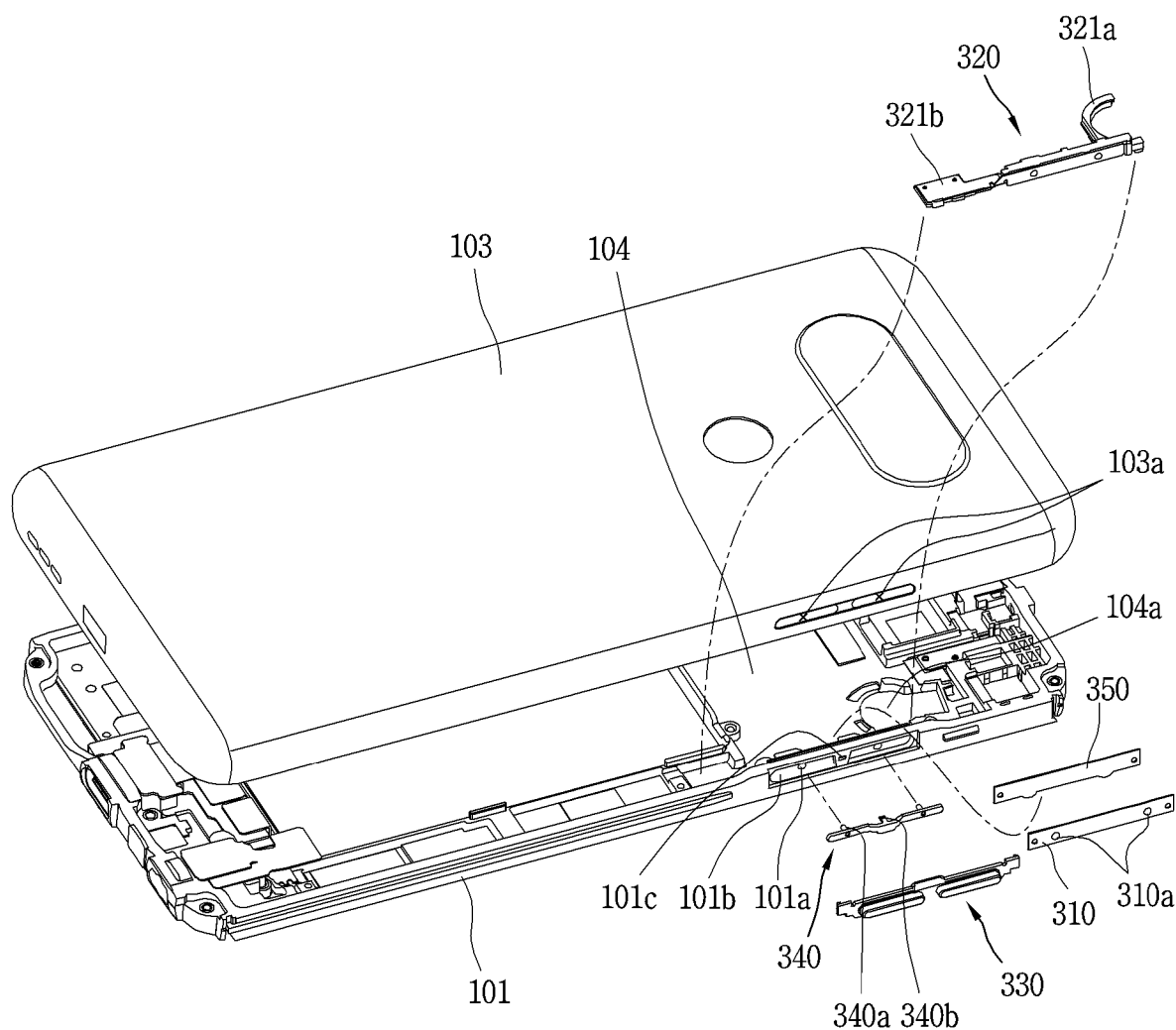
FIG. 3 is an exploded diagram illustrating that a key module is separated from the main body of the mobile terminal.

FIG. 2A is a cross-sectional diagram of a mobile terminal, taken along line A-A. FIG. 3 is an exploded diagram illustrating that a key module is separated from a main body of the mobile terminal in FIG. 1B.

A space, into which the key module 300 of the mobile terminal main body 100 is inserted and which is formed by a front case 101, a rear surface cover 103, and an internal frame 104, is partitioned into a submergence area (inundation area) A1 and a waterproof area A2. Constituent elements that are not subject to damage to water and of which operations need to be performed by a user are arranged in the submergence area A1, and electronic components and the like that are subject to damage due to water are arranged in the waterproof area A2. The submergence area A1 and the waterproof area A2 are formed by providing a waterproof structure that forms an internal space in the terminal main body 100.

The key module 300 according to the present embodiment includes a first unit that is positioned in the submergence area A1, a second unit that is positioned in the waterproof area A2, and a waterproof layer 310 and an elastic deformation layer 350 that are formed between the first and second units.

The internal space in the mobile terminal according to the present embodiment is formed by combining the front case 101 and the internal frame 104 and by combining the rear surface cover 103, which is configured to cover the internal frame 104, and the front case 101.

The first unit is mounted on the rear cover 103 and the front case 101. The first unit includes a first unit 330, which is made up of a fixation lever 331 and a metal key 332, and a key bracket 340.

With reference to FIG. 3, the key bracket 340 is mounted on the rear surface cover 103. The key bracket 340 includes at least one pressing portion 340a that passes through the rear surface cover 103 and then protrudes toward the inside of the terminal main body 100. The rear surface cover 103 includes a fixation structure 101c for fixing the key bracket 340, a recess portion 101b that is formed in such a manner that the key bracket 340 stably reaches into it, and at least one first through hole 101a that is formed in such a manner that the pressing portion 340a passes through it. In addition, the key bracket 340 may include an insertion structure 340b that is formed to be fixed to the fixation structure 101c.

The fixation lever 331 is coupled to the internal surface of the metal key 332. The metal key 332 is made of metal material and is exposed to the outside of the terminal main body 100. The rear surface cover 103 includes a second through hole 103a that is formed in such a manner that the metal key 332 passes through, and the metal key 332 on which the fixation lever 331 is mounted is exposed to the outside through the through hole 103a.

The fixation lever 331 may be made of rubber material that possibly readily adheres to metal material. A protrusion portion that is formed to correspond to the pressing portion 340a is formed on at least a portion of the fixation lever 331. The protrusion portion, the pressing portion 340a, and the metal key 332 are fixed to overlap each other.

Figure 2B:
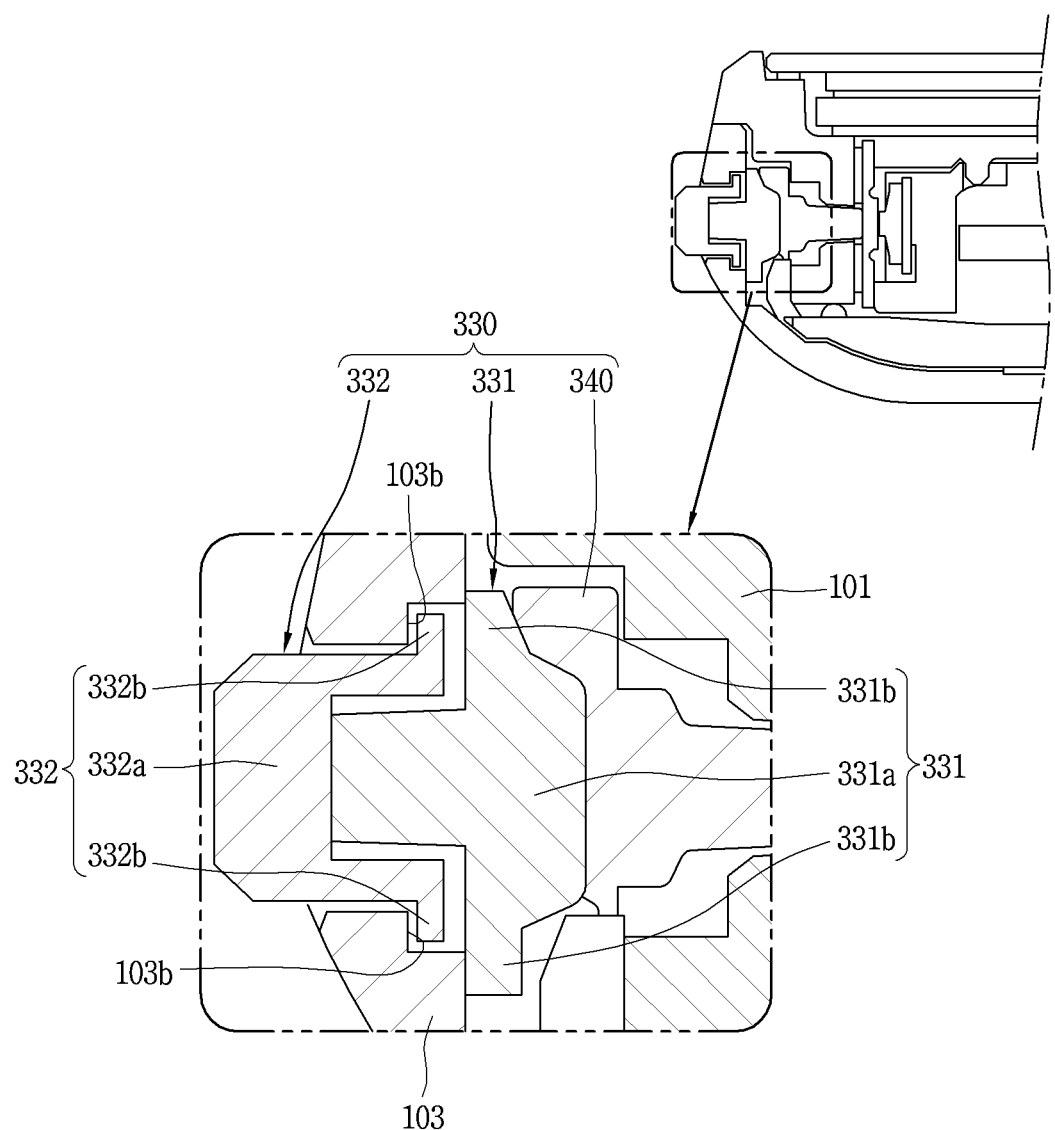
FIG. 2B is a partial cross-sectional diagram illustrating a first unit that is mounted on a rear surface cover.

FIG. 2B is a partial cross-sectional diagram illustrating the first unit that is mounted on the rear surface cover. With reference to FIGS. 2A and 2B, the metal key 332 includes an exposure portion 332a that is exposed to the outside and to which an external force is applied with a user's hand, and a hooking portion 332b that is mounted on the rear surface cover 103. The second through hole 103a in the rear surface cover 103 is configured to surround the exposure portion 332a. A cross section of the hooking portion 332b is formed to be larger than a cross section of the exposure portion 332a, and an edge part of the hooking portion 332b is hooked onto a portion of the front case 101.

The rear surface cover 103 includes a stepped portion 103b onto which the hooking portion 332b is hooked. The hooking portion 332b is hooked onto the stepped portion 103b and thus the metal key 332 is prevented from being separated from the rear surface cover 103.

The fixation lever 331 is mounted on a surface of the metal key 332. For example, a recessed portion may be formed in the metal key 332, and a portion of the fixation lever 331 may be formed in the recessed portion.

A cross section of a portion of the fixation lever 331 may be formed to be larger than a cross section of the second through hole 103a that includes the stepped portion 103b. The fixation lever 331 includes a first portion 331a that is formed in such a manner as to be brought into contact with the key bracket 340, and second portion 331b of which a cross section is larger than a cross section of the first portion 331a and which is formed to be brought into contact with the rear surface cover 103.

Accordingly, a cross section of a portion of the fixation lever 331 is formed to be brought into contact with the rear surface cover 103, and the portion of the fixation lever 331 is not inserted into the second through hole 103a. Accordingly, the fixation lever 331 is not separated through the second through hole 103a. The fixation lever 331 on which at least one metal key 332 is mounted is mounted on the internal surface of the rear surface cover 103 in such a manner that at least one portion of the metal key 332 is exposed to the outside through the second through hole 103a. At this point, the internal surface of the rear surface cover 103 means a surface that is coupled to the front case 101. Separation from the rear surface cover 103 does not occur due to the hooking portion 332b of the metal key 332 and a shape of the fixation lever 331.

The second portion 331b of the fixation lever 331 may be mounted in such a manner as to be brought into contact with the key bracket 340, and a recessed portion may be formed in a portion of the key bracket 340 in such a manner that the second portion 331b is stably brought into contact with it. Due to an external force that is applied to the metal key 332, a portion of the key bracket 340, specifically, the pressing portion 340a, moves along the direction of the inside of the terminal main body 100.

Figure 2C:
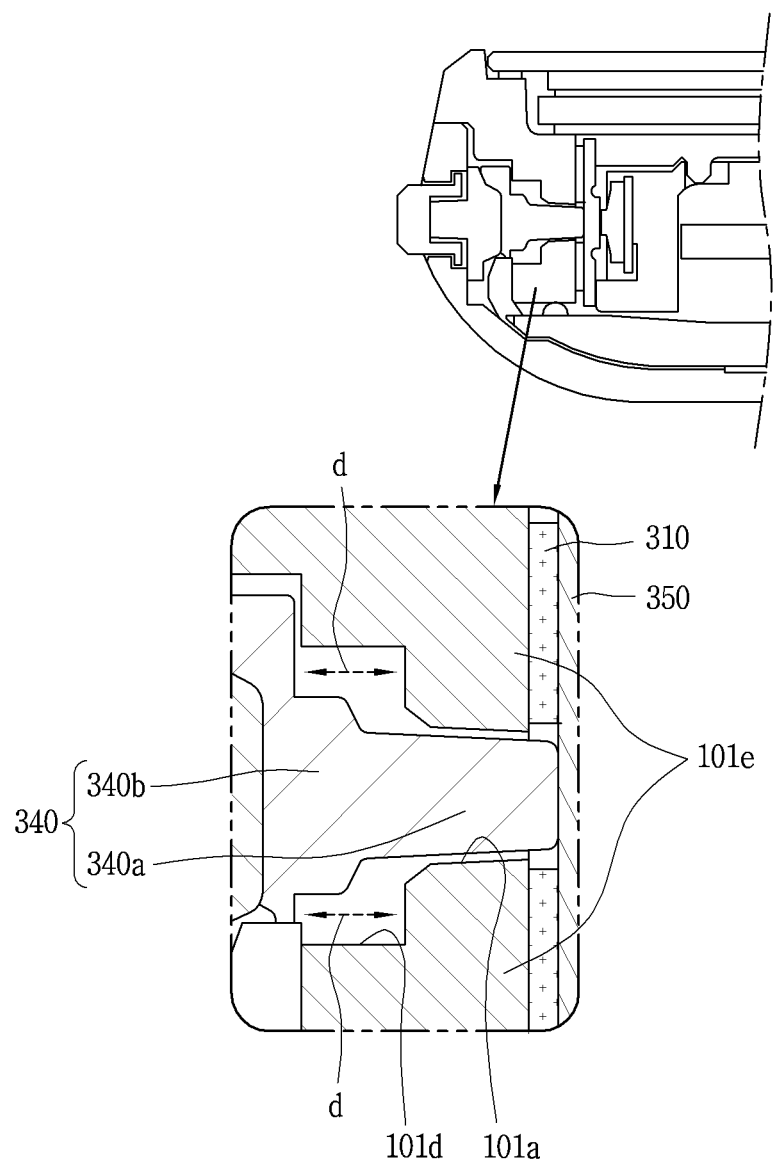
FIG. 2C is a conceptual diagram for describing a structure in which a bracket moves within an internal area in a terminal main body.

FIG. 2C is a conceptual diagram for describing a structure in which the bracket moves within an internal area within the terminal main body.

With reference to FIGS. 2A and 2C, the key bracket 340 includes a fixation portion 340c and the pressing portion 340a in order to be mounted on the front case 101. The insertion member 340b is formed in the fixation portion 340c. The pressing portion 340a extends in a direction from the fixation portion 340c.

The pressing portion 340a moves within the first through hole 101a in the front case 101. In addition, the front case 101 includes a moving hole 101d that communicates with the first through hole 101a. A cross section of the moving hole 101d may be formed to be larger in area than that of the first through hole 101a. The moving hole 101d is configured in such a manner to be deeper than a specific length d, and the fixation portion 340c of the key bracket 340 is configured to be hooked onto a step between the moving hole 101d and the first through hole 101a. Due to the step between the moving hole 101d and the first through hole 101a, movement of the pressing portion 340a is limited to the specific length d.

Water can be introduced through a space between the front case 101 and the rear cover 103, more specifically, a space between the metal key 332 and the front case 101.

On the other hand, the waterproof layer 310 and the elastic deformation layer 350, which are attached to the front case 101, form the waterproof area A2.

With reference to FIGS. 2A and 2C, the front case 101 includes an internal wall 101e that includes the first through hole 101a and through the first through hole 101a in which the pressing portion 340a protrudes. The internal wall 101e forms the internal space in the terminal main body 100. The pressing portion 340a passes through the first through hole 101a in the front case 101, and an end portion of the pressing portion 340a is brought into contact with the elastic deformation layer 350.

The waterproof layer 310 that has an adhesion property is formed between the elastic deformation layer 350 and the front case 101. The waterproof layer 310 is attached to the internal wall 101e. The elastic deformation layer 350 and the front case 101 adhere to each other. An opening hole 310a, which is formed in such a manner that the pressing portion 340a passes through it, is formed in the waterproof layer 310. The waterproof layer 310 is configured to surround the first through hole 101a. Accordingly, water that is introduced through the first through hole 101a is blocked from flowing.

Due to the adhesion between the waterproof layer 310 and the elastic deformation layer 350, water that is introduced into the submergence area A1 is blocked by the elastic deformation layer 350 from flowing. That is, the waterproof area A2 is formed with respect to the elastic deformation layer 350.

The elastic deformation layer 350 is made up of the first and second sheets that are different in terms of material. The first sheet is made of material that possibly adheres to the waterproof layer 310, and for example, may be a sheet that is made of polyurethane (PU). In addition, the second sheet may be made of rubber material.

The pressing portion 340a is brought into contact with a portion of the elastic deformation layer 350, and due to movement of the pressing portion 340a, portions including the portion described above are deformed in a specific range. The elastic deformation layer 350 includes a groove 350a that is formed to be adjacent to the portion described above. A thickness of a portion in the vicinity of the portion that is deformed is decreased due to the groove 350a, and thus deformation occurs readily. One other surface to which the waterproof layer 310 is not attached is recessed to form the groove 350a.

The second unit that is moved by the pressing portion 340a and generates a signal is positioned in the waterproof area A2.

The second unit includes a second unit 320 that includes a bracket 321 that is mounted on the front case 101 and a circuit substrate 322 that includes a dome key 323. The dome key 323 is formed on a portion of the circuit substrate 322, which corresponds to the pressing portion 340a.

With reference again to FIG. 2A, due to an external force that is applied to the metal key 332, the first unit 330 moves into the terminal main body 100, and a portion of the elastic deformation layer 350 is deformed by the pressing portion 340a, thereby pressing the dome key 323. Accordingly, when a signal is generated and the external force disappears, with an elastic force of the elastic deformation layer 350, the first unit 330 returns to its original position.

Figure 2D:
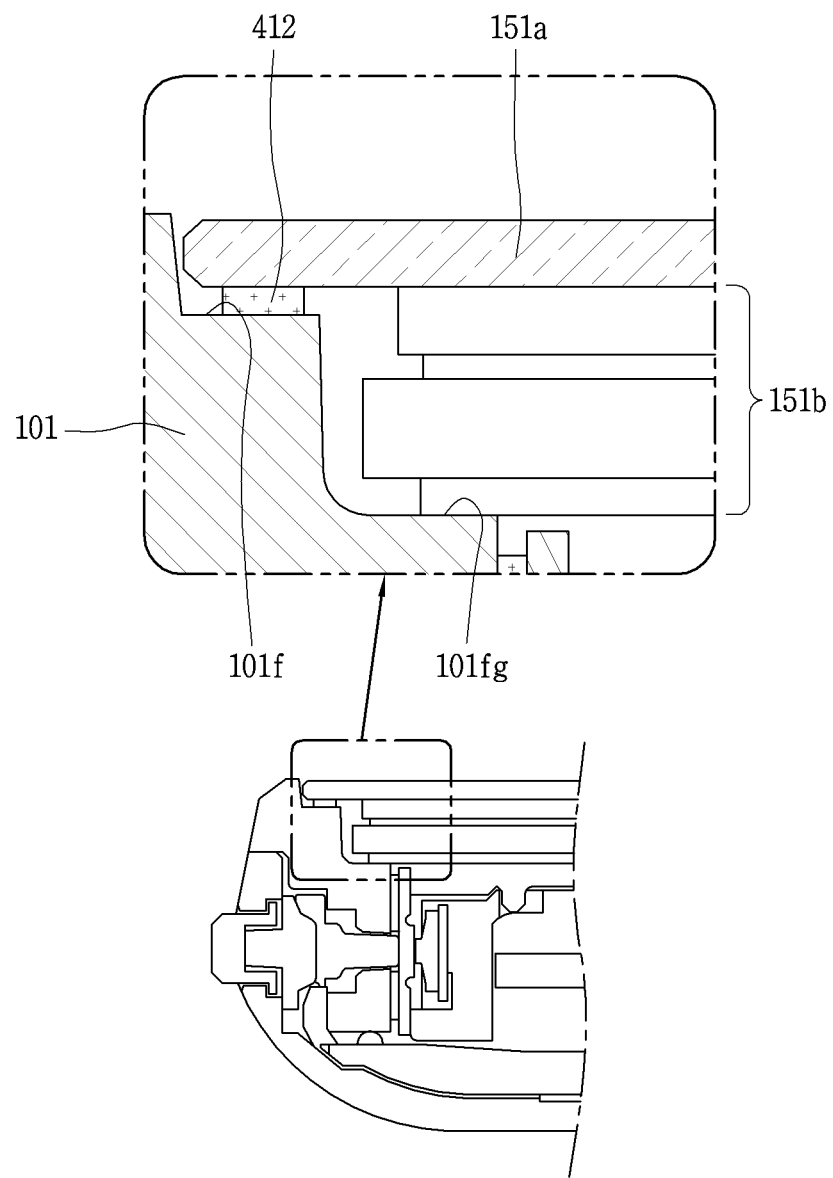
FIG. 2D is a conceptual diagram for describing a structure of a front case on which a display unit is mounted.
Figure 2E:
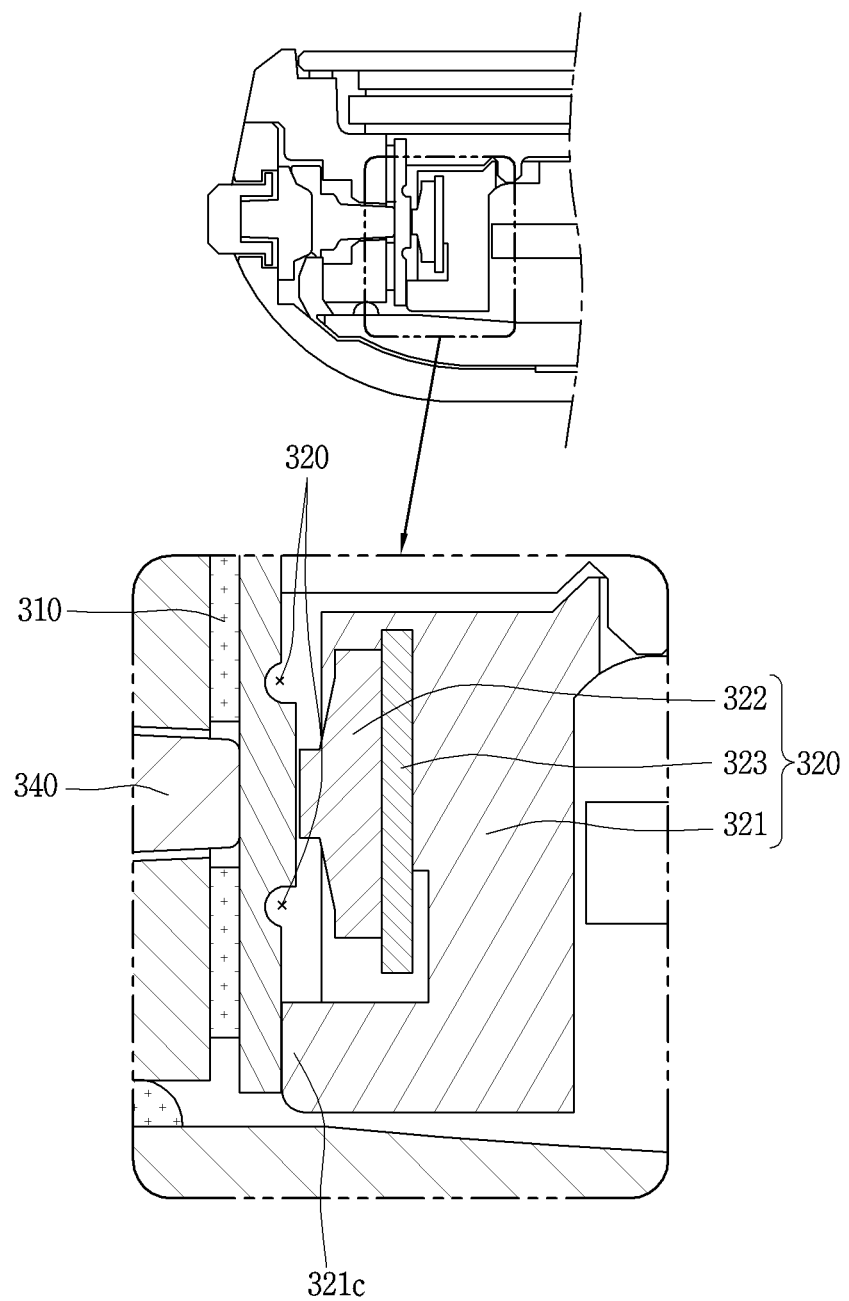
FIG. 2E is a conceptual diagram for describing a structure of the bracket.

FIG. 2E is a conceptual diagram for describing a structure of the bracket.

With reference to FIG. 3, the bracket 320 includes first and second fixation portions 321a and 321b in order to be mounted on the internal frame 104. The first and second fixation portions 321a and 321b may be mounted on a specific portion of the internal frame 104. The internal frame 104 may include a fixation portion 104a to which the first fixation portion 321a is fixed.

The bracket 320 includes a support portion 321c that is one end thereof. The support portion 321c may be configured in such a manner to support a portion of the elastic deformation layer 350, and the portion described above may be adjacent to an edge portion of the elastic deformation layer 350. Although an external force is applied with the pressing portion 340a, separation from the waterproof layer 310 can be prevented with the support portion 321c of the bracket 320 that is fixed to the internal frame 104.

While a signal is generated with the external force, due to the adhesiveness of the waterproof layer 310, a space is not formed between the elastic deformation layer 350 and the front case 101. Thus, water is blocked from being introduced into the second unit.

However, due to the hole that is formed in the waterproof layer 310, the movement of the pressing portion 340a is not limited. Thus, an amount of feeling of pressibility can be prevented from being decreased.

In addition, with reference to FIG. 2A, the terminal main body 100 further includes multiple waterproof members that make up the submergence area A1 and the waterproof area A2.

First, the terminal main body 100 further includes the internal frame 104 that is coupled to the front case 101 and supports at least one electronic component. The internal frame 104 is coupled to the front case 101, and then the rear surface cover 103 is formed to cover the internal frame 104.

The rear surface cover 103 is coupled to a portion of the front case 101 to cover the internal frame 104.

A first waterproof member 411 is formed on a portion where the internal frame 104 and the front case 101 overlap. The internal frame 104 may be formed on a portion where the front case 101 is coupled. The first member may be made of silicone material.

Accordingly, water that is introduced along the submergence area A1 is presented from being introduced into one other portion of the front case 101 instead of flowing into the waterproof area A2.

FIG. 2D is a conceptual diagram for describing a structure of the front case on which a display unit is mounted.

With reference to FIGS. 2A and 2D, the front case 101 includes a first step 101f and a second step 101g for supporting the display unit 151. The display unit 151 is positioned on the front case 101 and thus has an external appearance of the mobile terminal main body 100. The display unit 151 includes a window 151a and a display module 151b.

The first step 101f supports the window 151a. The second waterproof member 412 provides the adhesion between the first step 101f and the window 151a. The second waterproof member 412 is configured with a bonding member that adheres the display unit 151 to the front case 101. The bonding member is formed to be adjacent to an edge portion of the display unit 151.

The display module 151b is supported on the second step 101g.

Accordingly, with the second waterproof member 412, water is prevented from being introduced between the window 151a and the front case 101. Thus, the display module 151b is prevented from being submerged in water.

On the other hand, the third waterproof member 413 is formed between the rear surface cover 103 and the internal frame 104. The third waterproof member 413 may be configured with the bonding member. With the first waterproof member 411, water that is introduced between the first unit and the rear cover 103 is not introduced into the terminal main body 100, but can be introduced between the rear surface cover 103 and the internal frame 104. However, with the third waterproof member 413, the water is blocked from being introduced.

Accordingly, with the first, second, and third waterproof members 411, 412, and 413, a waterproof area other than the internal area within the terminal main body 100 may be additionally formed. Accordingly, the introduction of water into the terminal can be minimized and damage to or wear of components can be minimized.

Figure 4:
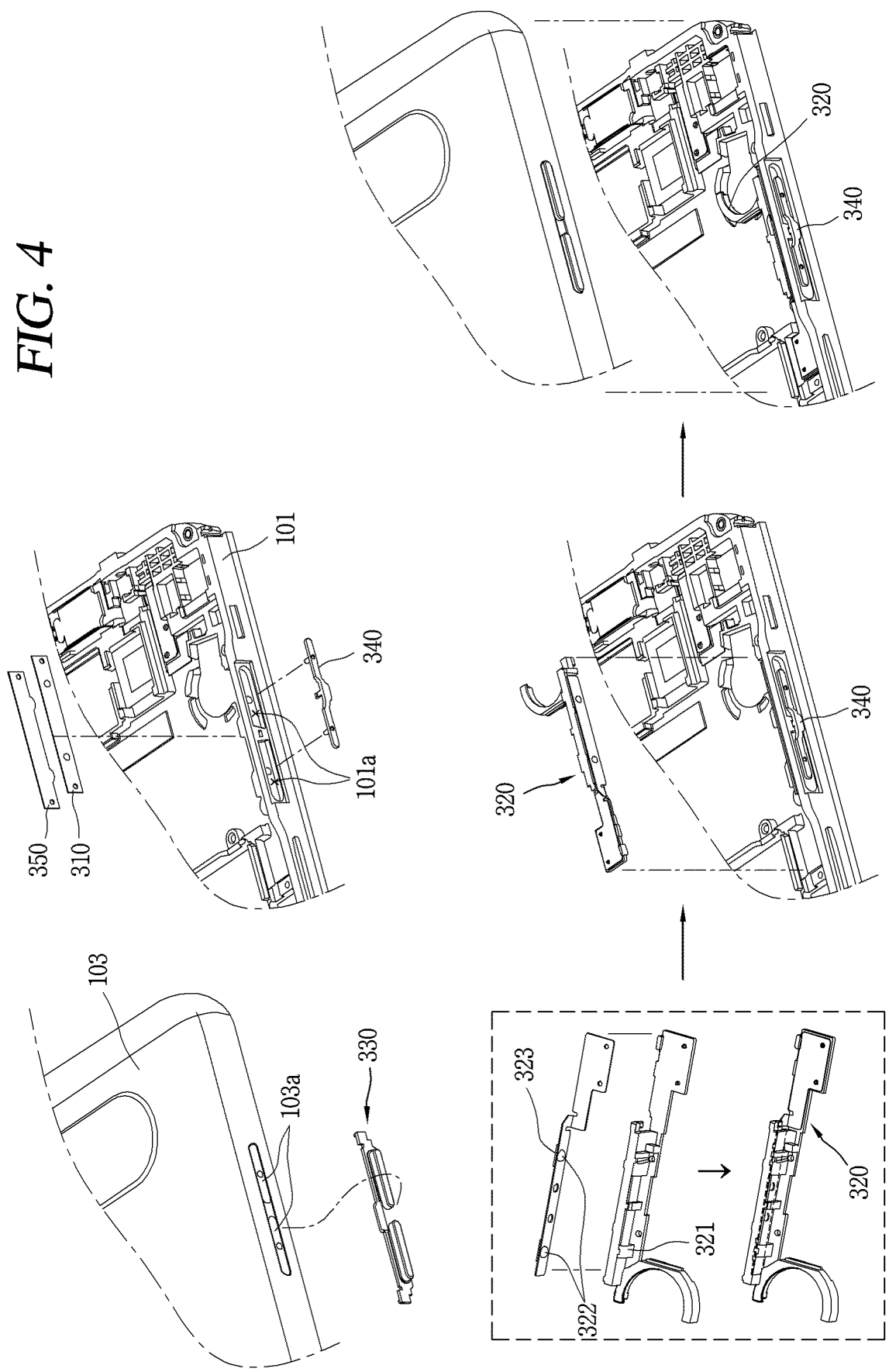
FIG. 4 is a conceptual diagram for describing the order in which key modules are mounted into the terminal main body according to the present embodiment.

FIG. 4 is a conceptual diagram for describing the order in which key modules are mounted into the terminal main body according to the present embodiment.

With reference to FIG. 4, the fixation lever 331 is mounted on the rear surface cover 103 in such a manner that the metal key 332 passes through the second through hole 103a that is formed in the rear surface cover 103.

On the other hand, the key bracket 340 is mounted on a surface of the front case 101. The pressing portion 340a that is included in the key bracket 340 passes through the first through hole 101a that is formed in the front case 101.

In a state where the key bracket 340 is fixed to the front case 101, the waterproof layer 310 is attached to one other surface that is opposite in direction to the surface of the front case 101, on which the key bracket 340 is mounted. The waterproof layer 310 and the key bracket 340 are arranged to face each other, and due to the hole that is formed in the waterproof layer 310, the pressing portion 340a of the key bracket 340 is not brought into contact with the waterproof layer 310.

The elastic deformation layer 350 is positioned on the waterproof layer 310.

On the other hand, the circuit substrate 322 that includes the dome key 322 is coupled to the bracket 321, and the second unit 320 that includes these is positioned on the elastic deformation layer 350. The front case 101 on which the second unit 320 is mounted, and the rear surface cover 103 on which the first unit 320 is mounted are assembled, and thus, the key module 300 is formed.

Accordingly, the waterproof layer 310 is positioned between the first and second units 320 and 330, and thus constituent elements can be readily assembled without an additional waterproof structure. Additional deformation or assembling that configures the key module to form the waterproof structure is unnecessary.

Figure 5A:
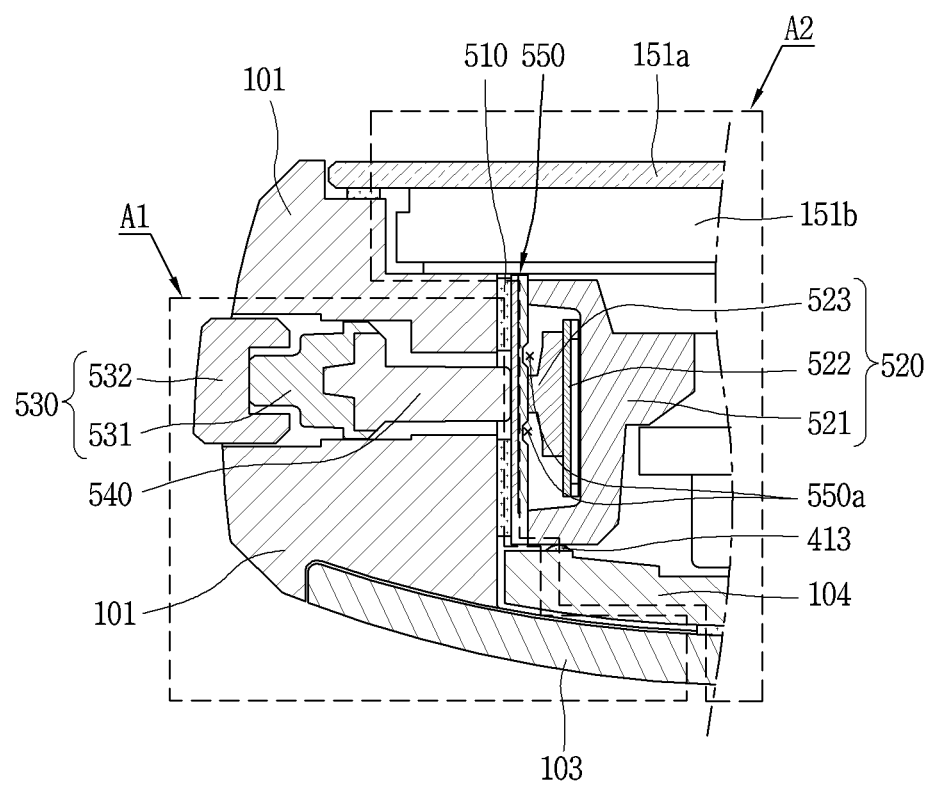
FIG. 5A is a cross-sectional diagram of the mobile terminal, taken along line A-A in FIG. 1B.
Figure 6:
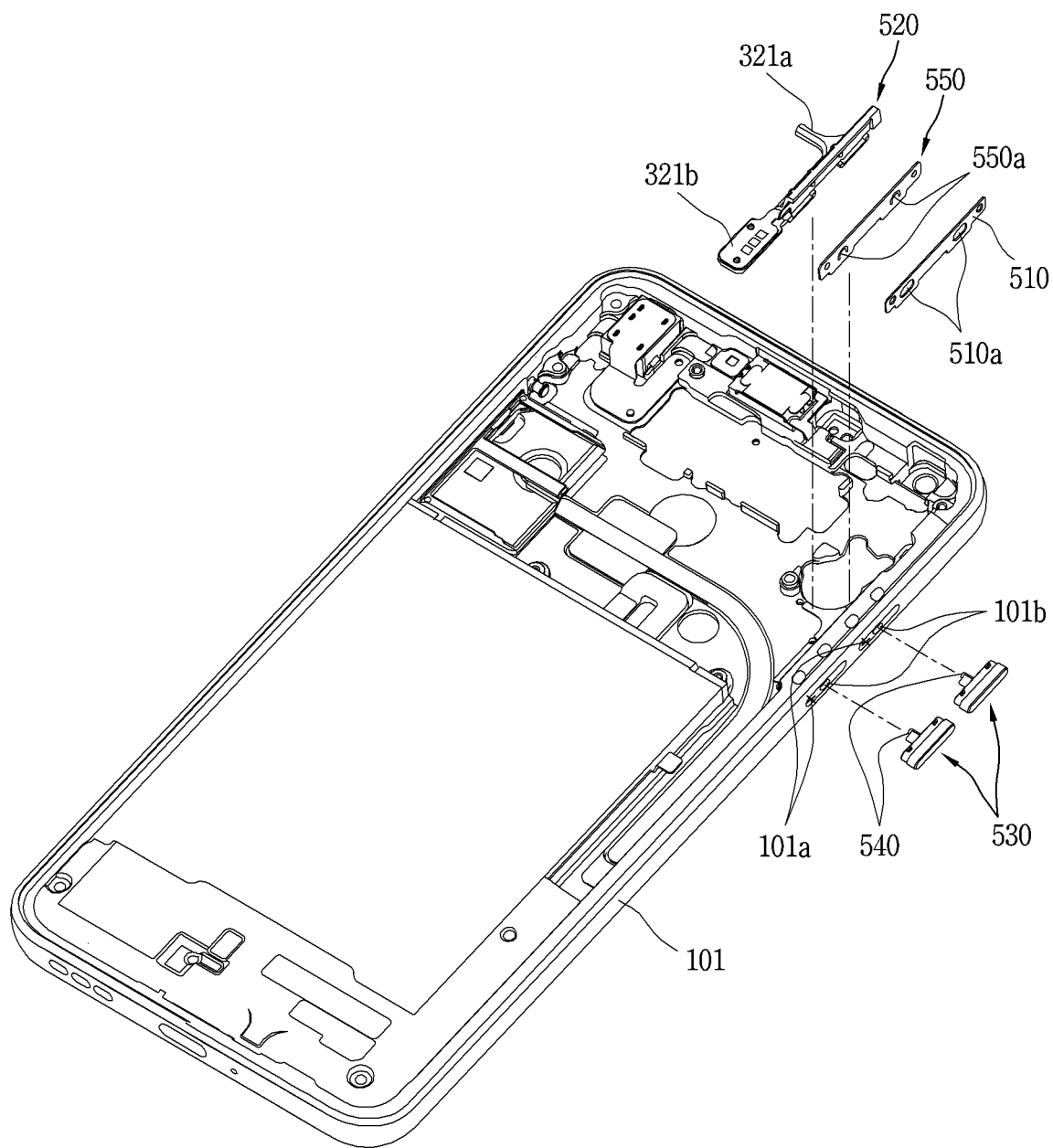
FIG. 6 is an exploded diagram illustrating that the key module is separated from the main body of the mobile terminal.

FIG. 5A is a cross-sectional diagram of the mobile terminal, taken along line A-A in FIG. 1B. FIG. 6 is an exploded diagram illustrating that a key module is separated from the main body of the mobile terminal.

A space, into which the key module 500 of the mobile terminal main body 100 is inserted and which is formed by the front case 101, the rear surface cover 103, and the internal frame 104, is partitioned into the submergence area A1 and the waterproof area A2. Constituent elements that are not subject to damage to water and of which operations need to be performed by a user are arranged in the submergence area A1, and electronic components and the like that are subject to damage due to water are arranged in the waterproof area A2. The submergence area A1 and the waterproof area A2 are formed by providing a waterproof structure that forms an internal space in the terminal main body 100.

The key module 500 according to the present embodiment includes a first unit that is positioned in the submergence area A1, a second unit that is positioned in the waterproof area A2, and a waterproof layer 510 and an elastic deformation layer 550 that are formed between the first and second units.

The internal space in the mobile terminal according to the present embodiment is formed by combining the front case 101 and the internal frame 104 and by combining the rear surface cover 103, which is configured to cover the internal frame 104, and the front case 101.

The first unit is mounted on the front case 101. The first unit 530 includes the fixation lever 331, the metal key 332, and a key bracket 540.

With reference to FIG. 6, the key bracket 540 is mounted on the front case 101. The front case 101 includes the recess portion 101b that is formed in such a manner that the key bracket 540 stably reaches into it, and at least one through hole 101a that is formed in such a manner that an end portion of the bracket 540 passes through it.

A fixation lever 531 is coupled to the internal surface of a metal key 532. The fixation lever 531 may be made of rubber material that possibly readily adheres to metal material. The fixation lever 531 and the key bracket 540 may also be integrally combined into one piece.

The fixation lever 531 on which at least one metal key 532 is mounted is mounted from the direction of the external surface of the front case 101 in such a manner that at least one portion of the metal key 532 is exposed to the outside through the through hole 101a. The external surface here refers to a surface that has an exterior appearance of the terminal main body 100.

Figure 5B:
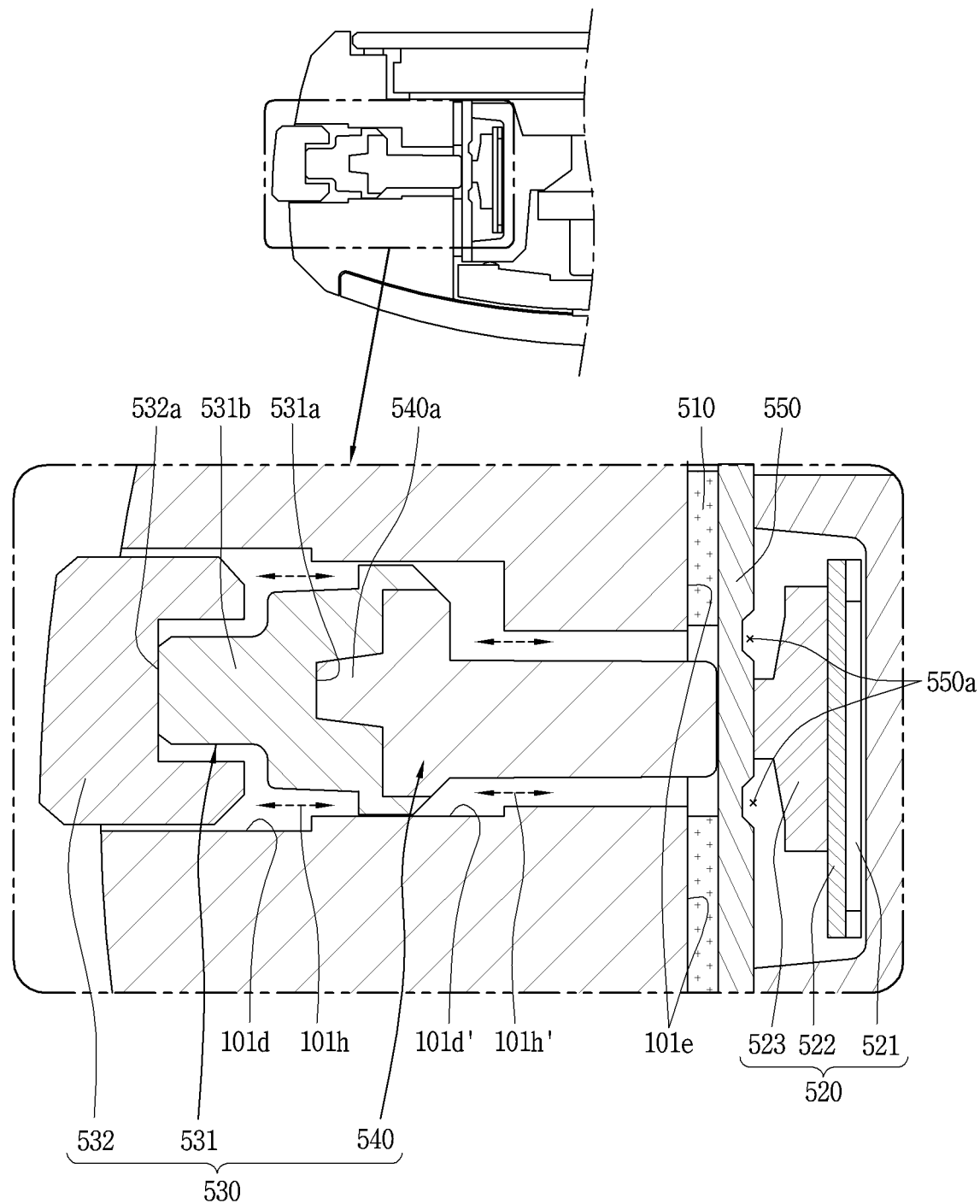
FIG. 5B is a partial cross-sectional diagram for describing a structure of the first unit.

FIG. 5B is a partial cross-sectional diagram for describing a structure of the first unit.

With reference to FIGS. 5A and 5B, the metal key 532 includes a fixation portion 532*a* of which a surface is recessed, and the fixation lever 531 includes a fixation protrusion 531*b* that is fixed to the fixation portion 532*a*. The fixation lever 531 includes a fixation portion 531*a* that is formed on a portion which is opposite in direction to the fixation protrusion 531*b*.

The key bracket 540 includes a fixation protrusion 540*a* that is fixed to the fixation portion 531*a* of the fixation lever 531. The metal key 532, the fixation lever 531, and the key bracket 540 are integrally combined into one piece.

Due to an external force that is applied to the metal key 532, the fixation lever 531 and the key bracket 540 move toward the inside of the terminal main body 100.

The front case 101 includes first and second moving holes 101*d* and 101*d*'s that communicate with the first through hole 101*a*. The fixation lever 531 is movably inserted into the first moving hole 101*d*, and the key bracket 540 is movably inserted into the second moving hole 101*d'*.

The front case 101 includes a first step 101*h* that blocks the metal key 532 from moving, and a second step 101*h'* that blocks the fixation lever 531 from moving. With the first and second steps 101*h* and 101*h'*, the first unit moves a specific distance, and a limitation on the movement of the first unit can cause damage to the elastic deformation layer 550.

Although not illustrated in the drawings, the key bracket 540 may include a fixation structure in which the first unit 530 is made to be separated from the front case 101. For example, the fixation lever 531 may include a hooking portion in order to be fixed to the front case 101, and the front case 101 may include a hooking groove that, due to the hooking portion being hooked, puts a limitation on the movement of the metal key 532 in the opposite direction.

The waterproof layer 510 and the elastic deformation layer 550, which are attached to the front case 101, form the waterproof area A2. An end portion of the key bracket 540 is brought into contact with the elastic deformation layer 350.

The front case 101 includes the internal wall 101*e* that includes the first through hole 101*a* and through the first through hole 101*a* in which the pressing portion 340*a* protrudes. The internal wall 101*e* forms the internal space in the terminal main body 100.

The waterproof layer 510 that has an adhesion property is formed between the elastic deformation layer 350 and the front case 101, and thus the elastic deformation layer 550 and the front case 101 are adhered to each other. An opening hole 510*a*, which is formed in such a manner that the key bracket 540 passes through it, is formed in the waterproof layer 510.

Due to the adhesion between the waterproof layer 510 and the elastic deformation layer 550, water that is introduced into the inundation area A1 is blocked by the elastic deformation layer 550 from flowing. That is, the waterproof area A2 is formed with respect to the elastic deformation layer 550.

The waterproof layer 310 is configured to surround the first through hole 101*a*. Accordingly, water that is introduced through the first through hole 101*a* is blocked from flowing.

The elastic deformation layer 550 is made up of first and second sheets that are different in terms of material. The first sheet is made of material that possibly adheres to the waterproof layer 510, and for example, may be a sheet that is made of polyurethane (PU). In addition, the second sheet may be made of rubber material.

The key bracket 540 is brought into contact with a portion of the elastic deformation layer 550, and due to movement of the key bracket 540, portions including the portion described above are deformed in a specific range. The elastic deformation layer 550 includes a groove 550*a* that is formed to be adjacent to the portion described above. A thickness of a portion in the vicinity of the portion that is deformed is decreased determination unit to the groove 550*a*, and thus deformation occurs readily. One other surface to which the waterproof layer 510 is not attached is recessed to form the groove 550*a*.

The second unit that is moved by the key bracket 540 and generates a signal is positioned in the waterproof area A2.

Figure 5C:
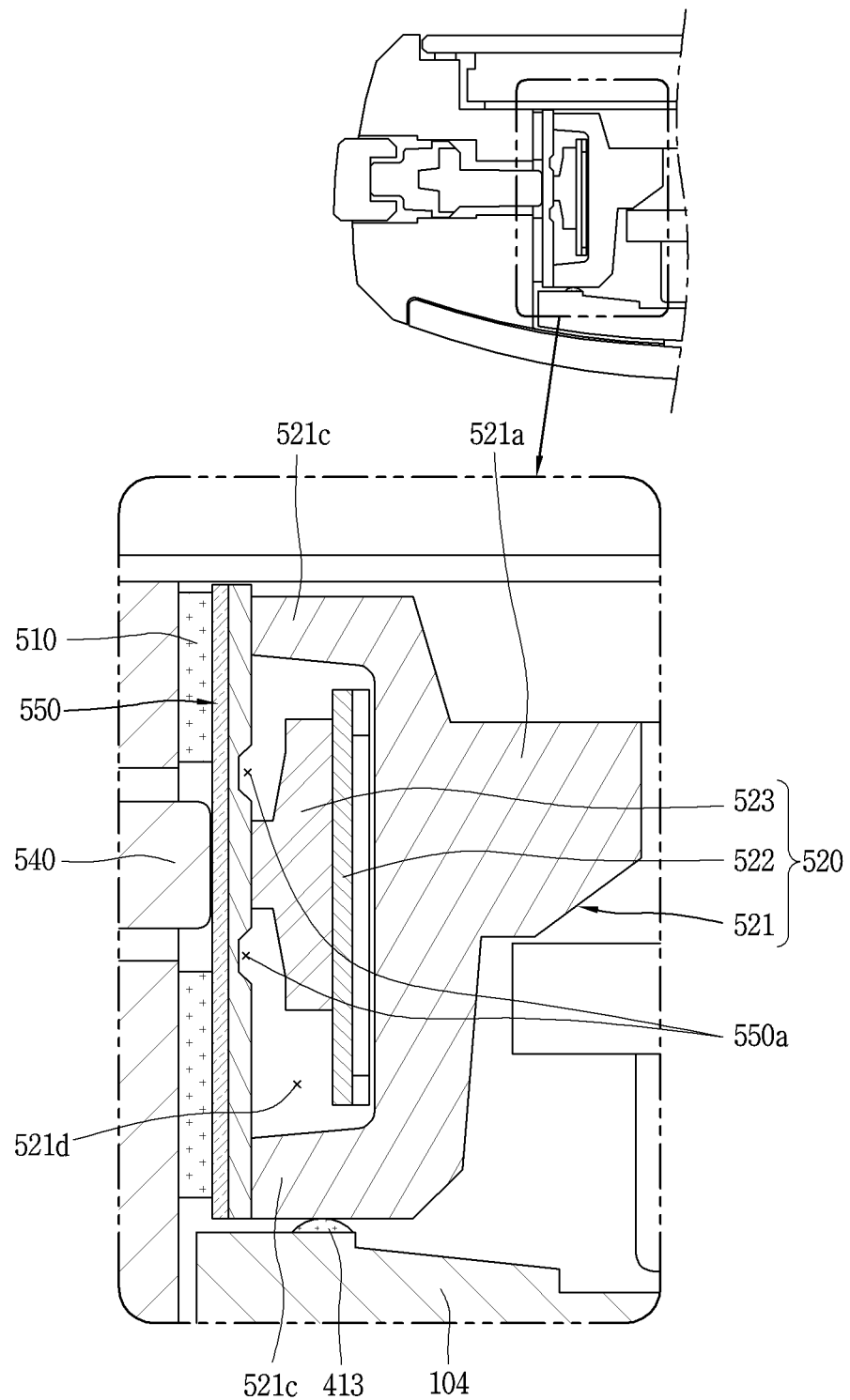
FIG. 5C is a conceptual diagram for describing the structure of the bracket.

FIG. 5C is a conceptual diagram for describing a structure of the bracket.

The second unit includes a second unit 520 that includes a bracket 521 that is mounted on the front case 101 and a circuit substrate 522 that includes a dome key 523. The dome key 523 is formed on a portion of the circuit substrate 522, which corresponds to the key bracket 540.

The bracket 521 includes first and second fixation portions 521*a* and 521*b* that are fixed to the internal frame 104. The first and second fixation portions 521*a* and 521*b* may be mounted on a specific portion of the internal frame 104. The internal frame 104 may include a fixation portion 104*a* to which the first fixation portion 521*a* is fixed.

In addition, the bracket 521 includes a support portion 521*c* that supports the elastic deformation layer 550. The support portion 521*c* may be configured in such a manner to support a portion of the elastic deformation layer 550, and the portion described above may be adjacent to an edge portion of the elastic deformation layer 550. Although an external force is applied with the key bracket 540, separation from the waterproof layer 310 can be prevented with the support portion 521*c* of the bracket 520 that is fixed to the internal frame 104.

With reference again to FIGS. 5A and 5C, due to an external force that is applied to the metal key 532, the first unit 530 moves into the terminal main body 100, and a portion of the elastic deformation layer 550 is deformed by the key bracket 540, thereby pressing the dome key 523. Accordingly, when a signal is generated and the external force disappears, with an elastic force of the elastic deformation layer 550, the first unit 530 returns to its original position. In a case where the first unit 530 returns to its original position, a problem that the first unit 530 is separated from the front case 101 can also be prevented with the fixation of the fixation lever 531 to the front case 101.

While a signal is generated with the external force, due to the adhesiveness of the waterproof layer 510, a space is not formed between the elastic deformation layer 550 and the front case 101. Thus, water is blocked from being introduced into the second unit.

However, due to the opening hole 510*a* that is formed in the waterproof layer 510, the movement of the pressing portion 540*a* is not limited. Thus, an amount of feeling of pressibility can be presented from being decreased.

Figure 5D:
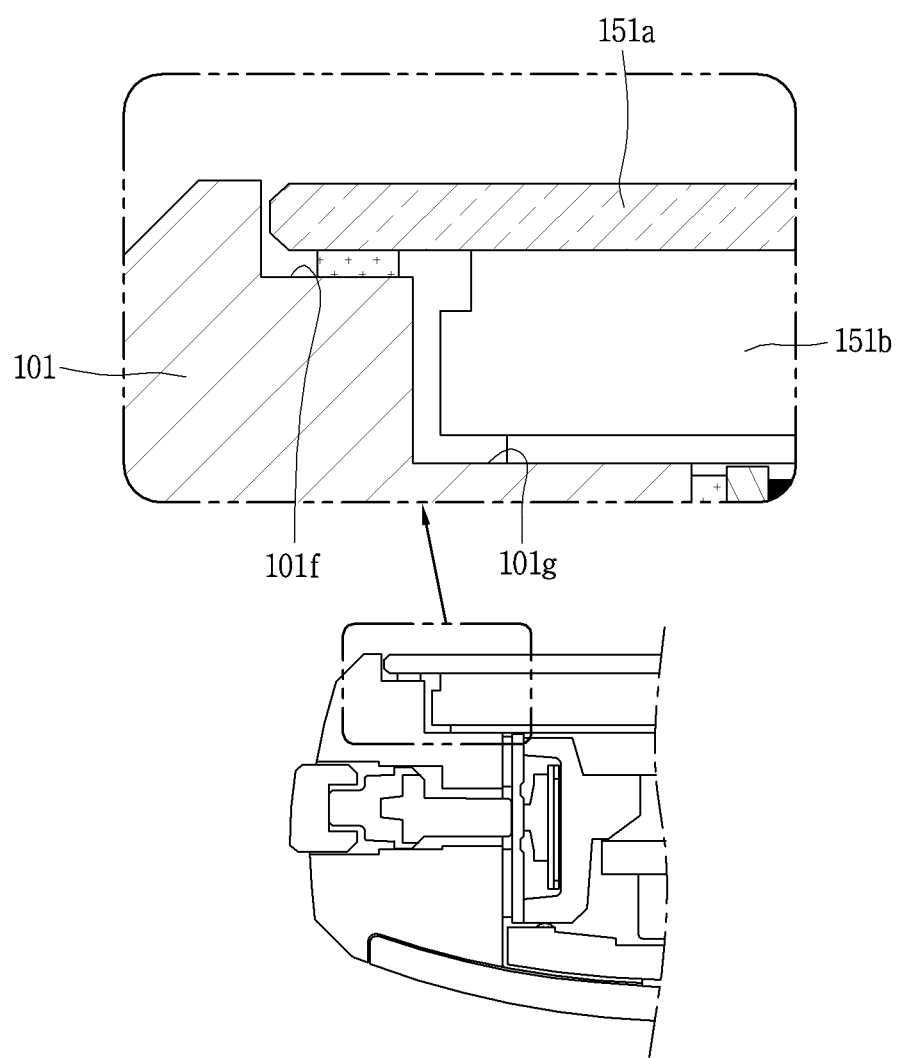
FIG. 5D is a conceptual diagram for describing the structure of the front case on which the display unit is mounted.

FIG. 5D is a conceptual diagram for describing the structure of the front case on which the display unit is mounted.

With reference to FIGS. 5A and 5D, the front case 101 includes the first step 101*f* and the second step 101*g* for supporting the display unit 151.

The display unit 151 is positioned on the front case 101 and thus has an external appearance of the mobile terminal main body 100. The display unit 151 includes a window 151a and a display module 151b.

The first step 101f supports the window 151a. A bonding portion provides the adhesion between the first step 101f and the window 151a. With the bonding unit, water can be blocked from flowing between the window 151a and the front case 101.

Figure 7:
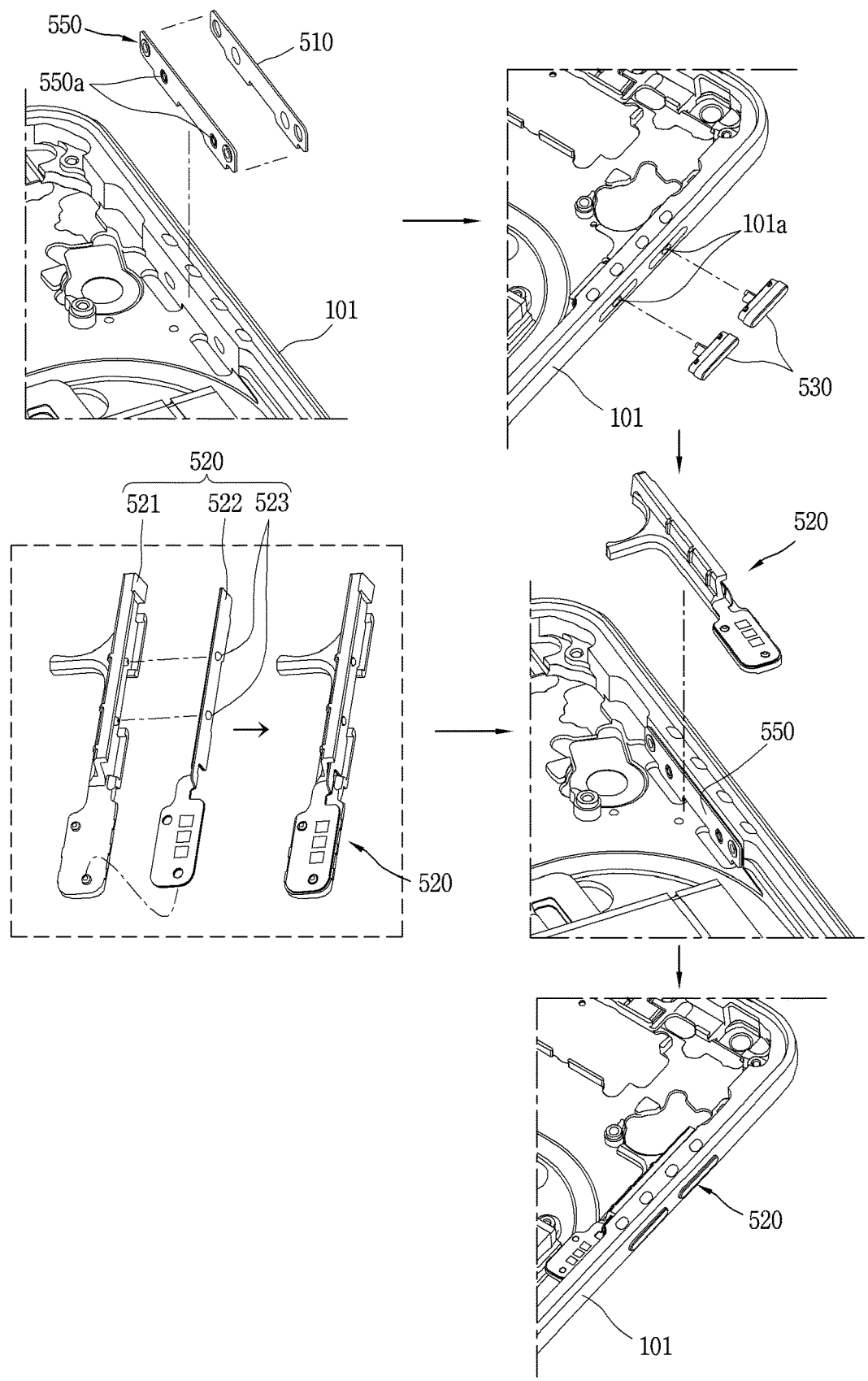
FIG. 7 is a conceptual diagram for describing the order in which the key modules are mounted into the terminal main body according to the present embodiment.

FIG. 7 is a conceptual diagram for describing the order in which the key modules are mounted into the terminal main body according to the present embodiment.

With reference to FIG. 7, the first unit that includes the fixation lever 531 on which the key bracket 540 is mounted, and the metal key 532 is mounted on the recess portion 101b that is formed in the front case 101. The key bracket 540 is inserted into the opening hole 101a in the front case 101. The first unit 530 is inserted from the direction of the external surface of the front case 101, and the external surface here refers to the surface that has the external appearance of the terminal main body 101.

The waterproof layer 510 is attached to an internal surface that is opposite in direction to the external surface of the front case 101. Due to the hole that is formed in the waterproof layer 510, the key bracket 540 is not adhered to the waterproof layer 510.

The elastic deformation layer 550 is positioned on the waterproof layer 510.

On the other hand, the circuit substrate 522 that includes the dome key 522 is coupled to the bracket 521, and the second unit 520 that includes these are mounted to the elastic deformation layer 550, thereby coupling the first and second units 510 and 520.

Accordingly, the waterproof layer 510 is positioned between the first and second units 520 and 530, and thus constituent elements can be readily assembled without an addition waterproof structure. Additional deformation or assembling that configures the key module to form the waterproof structure is unnecessary.

Figure 8A:
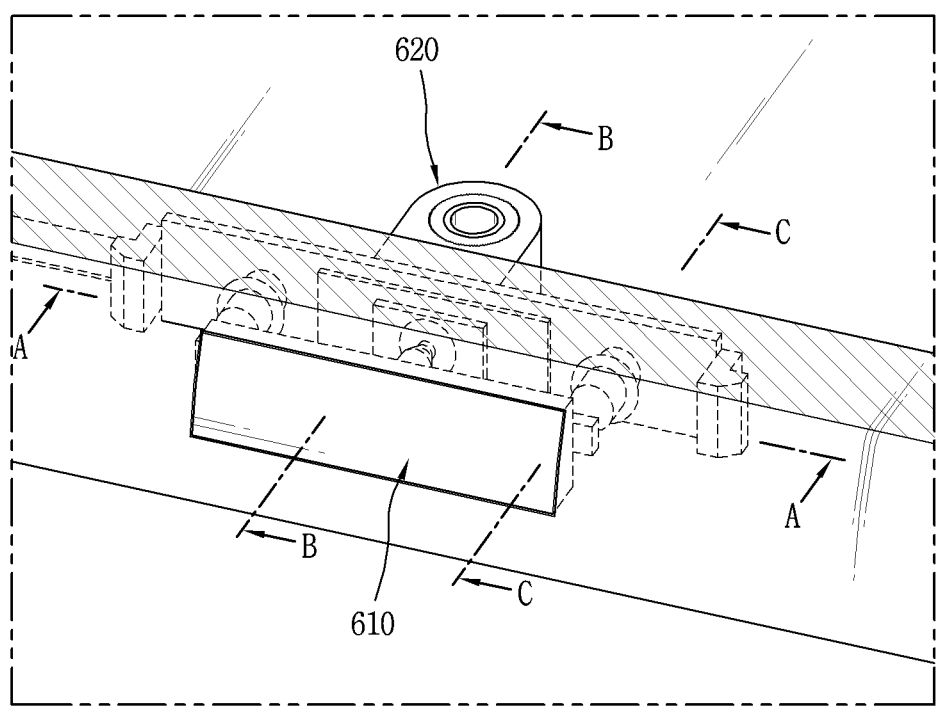
FIG. 8A is a diagram for describing the key module of the mobile terminal in FIG. 1B.

FIG. 8A is a conceptual diagram for describing the key module of the mobile terminal in FIG. 1B, and is a cross-sectional diagram taken along line A-A in FIG. 8A.

A space, into which a key module 600 of the mobile terminal main body 100 is inserted and which is formed by the front case 101, the rear surface cover 103, and the internal frame 104, is partitioned into the submergence area A1 and the waterproof area A2. Constituent elements that are not subject to damage to water and of which operations need to be performed by a user are arranged in the submergence area A1, and electronic components and the like that are subject to damage due to water are arranged in the waterproof area A2. The submergence area A1 and the waterproof area A2 are formed by providing a waterproof structure that forms an internal space in the terminal main body 100.

A user input unit 600 according to the present embodiment a first unit that is positioned in the submergence area A1, and a second unit that is positioned in the waterproof area A2.

The internal space in the mobile terminal according to the present embodiment is formed by a recess space that is formed in the front case 101. The first and second units 610 and 620 are inserted into first and second internal space 105 and 106, respectively, that are formed in the front case 101, and thus are fixed to them, respectively. The first unit 610 is mounted in such a manner that it is not exposed to the outside of the front case 101, and the second unit 620 are mounted on the internal surface of the front case 101. Based on the movement of the first unit 101, a portion of the second unit 101 is pressed and thus a control signal is generated.

In FIG. 2A, a surface of the front case 101 is realized as a stable-reaching surface 104 into which the window 151a reaches stably. The stable-reaching surface 104 is formed along an edge of the window 151a. The key module 600 is mounted on a flank surface that overlaps the stable-reaching surface 104.

The first unit 600 includes a pressing key 610, a key bracket 612, and a lever portion 613.

A portion of the pressing key 610 is positioned in such a manner that it protrudes from a flank surface of the front case 101 and is pressed by the user. The pressing key 610 may be made of metal material, and a shape thereof is not limited to ones that are illustrated in the drawings.

The pressing key 610 includes a body portion 611a, and a fixation protrusion 611b, and a pressing protrusion 611c. The body portion 611a is formed in such a manner that a surface thereof is exposed to the outside at the flank surface of the front case 101. The fixation protrusions 611b are formed to protrude from both ends, respectively, of the body portion 611a. The fixation protrusions 611b are formed in a manner that is adjacent to one other surface of the body portion 611a that is not exposed.

The fixation protrusion 611b is inserted into the internal space 105 in the front case 101, and the body portion 611a is hooked onto the front case 101. Thus, the body 611a is made not to be separated from the front case 101. An end portion of the fixation protrusion 611b is configured to have an inclined surface 611b'. That is, as an end of the end portion of the fixation protrusion 611b is approached more closely, an area of a cross section thereof is smaller. Accordingly, when the fixation protrusion 611b is inserted into the first internal space 105, the fixation protrusion 611b may be inserted along the inclined surface 611b'.

The fixation protrusion 611 is mounted into the internal space in the front case 104 instead of protruding toward the stable-reaching surface 104, and thus the stable-reaching surface 104 for attaching the window 151a can be secured to the maximum. In addition, a hole is not formed in the stable-reaching surface 104, and thus a problem that water is introduced along the stable-reaching surface 104 can be prevented.

The pressing protrusion 611c protrudes from the other one of the body portion 611a. That is, the pressing protrusion 611c protrudes toward the internal space in the front case 101. With the pressing protrusion 611c, a portion of the second unit 620 is pressed.

The key bracket 612 that is made of SUS material is formed on the pressing protrusion 611c, and the lever portion 613 is formed to surround the key bracket 612. The level portion 613 includes a first portion that surrounds the pressing protrusion 611c, and a second portion that extends from the pressing protrusion 611c. The first portion is formed to have an outer circumference that is smaller than an outer circumference of the second portion. The key bracket 612 is formed between the pressing protrusion 611c and the lever portion 613. A first portion of the key bracket 612 is formed to surround the pressing protrusion 611c, and a second portion of the key bracket 612 is configured to overlap advance second portion of the lever portion 613.

The lever portion 613 is formed to fill a gap between the front case 101 and the key bracket 612. The lever portion 613 is made of material that is elastically transformable in a manner that expands and contracts according to the movement of the pressing protrusion 611c. Accordingly, water that is introduced between the front case 101 and the body portion 611a is prevented by the lever portion 613 from being introduced into the second unit 620.

The body portion 611a is positioned within the first internal space 105 in such a manner that it moves a specific distance d. Based on an external force that is applied to the body portion 611a, the fixation protrusion 611b can move further the specific distance inward.

On the other hand, the second unit 620 is positioned in any other portion of the front case 101 in such a manner that it is brought into contact without the lever portion 613.

The second unit 620 includes a fixation body 621, an O-ring 622, a circuit substrate 623, and a dome key portion 624. The fixation body 621 includes a base portion 621a, a first fixation portion 621b, a second fixation portion 621c, and a third fixation portion 621d.

The first, second, and third fixation portions 621b, 621c, and 621d are formed in a manner that extends from the base portion 621a. The base portion 621a extends in such a manner that it faces a portion of a flank surface of the front case 101.

The circuit substrate 623 and the dome key portion 624 are arranged on a surface of the base portion 621a. The circuit substrate 623 and the dome key portion 624 that are combined with each other are arranged in an area that overlaps the pressing protrusion 611c, in such a manner that they are brought into contact with the lever portion 613. The pressing protrusion 611c passes through a through hole 105b (refer to FIG. 10A) in the first internal space 105 in order to be brought into contact with the dome key portion 624 and thus to press the dome key portion 624.

The first fixation portion 621b protrudes from one other surface of the base portion 621a and is fixed to the front case 101 or the internal frame. The first fixation portion 621b may be formed in a manner that overlaps an area where the circuit substrate 623 is positioned. The first fixation portion 621b supports the base portion 621a in such a manner that it does not move due to an external force which is applied. The first fixation portion 621b includes a fastening hole 621b' into which a fastening member is mounted to fix the front case 101. The fastening hole 621b' is formed in the thickness direction of the first fixation portion 621b. Accordingly, in a case where due to the external force, the pressing portion 611c moves and thus presses the dome key portion 624, the first fixation portion 621b can also support the base member 621a. Thus, the second unit 620 can be prevented from moving or being separated from the front case 101.

The second fixation portion 621c protrudes from the surface of the base portion 621a. That is, the second fixation portion 621c protrudes in a direction of decreasing a distance to the first unit 610 and is inserted into a specific hole in the front case 101. The second fixation portion 621c is configured with a pair of fixation protrusions, and the pair of fixation protrusions are arranged with the circuit substrate 623 and the dome key portion 624 in between.

The pair of fixation protrusions 611b are inserted into a pair of second areas 106b (refer to FIG. 10B), respectively, of the second internal space 106. The pair of second areas 106b are configured with holes into which the pair of fixation protrusions 611b are inserted, and are formed in such a manner that they communicate with the first internal space 105.

The O-ring 622 is inserted into each of the pair of fixation protrusions 611b. The O-ring 622 fills a gap between the fixation protrusion 611b and the second area 106b. Therefore, the pair of O-rings 622 block water that is introduced into the first internal space 105, from being introduced into the second internal space 106.

With the O-ring 622, the lever portion 512, and the lever portion 613, the second internal space 106 may be realized as a waterproof area.

A pair of third fixation portions 621d are formed to protrude from both ends, respectively, of the base portion 621a. The third fixation portion 621d extends from a surface of the base portion 621a, and a surface thereof is formed to be an inclined surface 621d'. A second hooking portion 101b, which prevents the third fixation portion 621d from being separated after being mounted, may be formed in the front case 101.

When the third fixation portion 621d moves along the inclined 621d' into the front case 101 and stably reaches into a portion of the second internal space 106, a portion of the third fixation portion 621d is hooked onto the second hooking portion 101b. Therefore, the base portion 621a can be prevented from being separated from the front case 101.

Figure 9A:
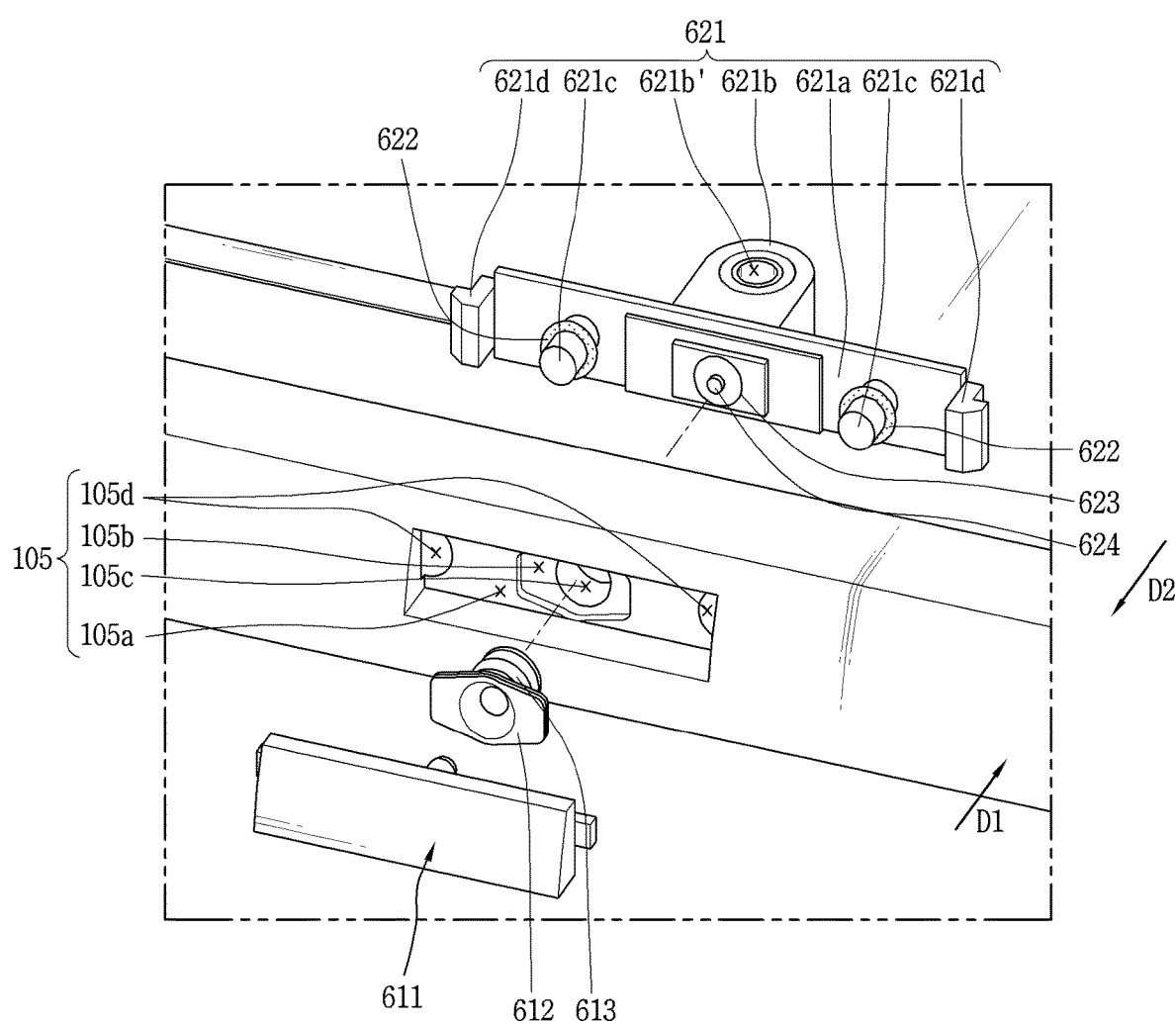
FIGS. 9A and 9B are conceptual diagrams for describing first and second units that are inserted into first and second internal spaces, respectively.
Figure 9B:
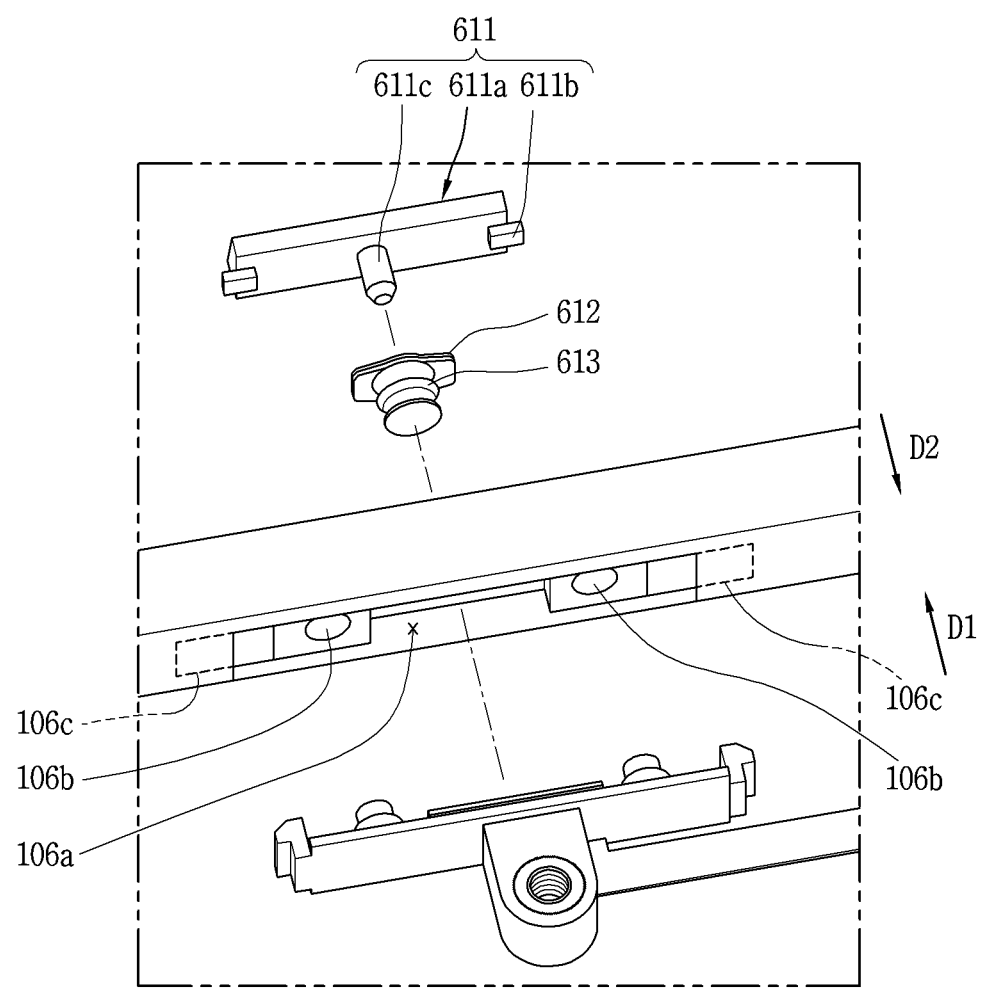

FIGS. 9A and 9B are conceptual diagrams for describing the first and second units that are inserted into the first and second internal spaces, respectively.

With reference to FIGS. 9A and 9B, the first unit 610 and the second unit 620 are inserted into the front case 101, in a first direction D1 and a second direction D2, respectively, which is opposite to the first direction D1.

The front case 101 is recessed in opposite directions to form the first and second internal spaces 105 and 106, respectively.

The first unit 610 is mounted into the first internal space 105. The first internal space 105 includes first, second, third, and fourth spaces 105a, 105b, 105c, and 105d that are connected to each other.

The first space 105a may be formed in substantially the same manner as a shape of the body portion 611a. Alternatively, the first space 105a may be formed to have a depth that is smaller than a depth of the body portion 611a.

The second and third spaces 105b and 105c are formed to extend from the first space 105a. The second space 105b is formed in such a manner that the second portions of the key bracket 612 and the lever portion 613 are accommodated into it, and the third space 105c is configured with a communication hole that connects between the first internal space 105 and the second internal space 106.

The lever portion 613 passes through the third space 105c.

A pair of fourth spaces 105d extend from the first space 105a, and are arranged adjacent to both ends, respectively, of the first space 105a. The pair of fixation protrusions 611b are inserted into the first space 105a. A portion of the fourth space 105d is made up of an exposure area that is exposed by the first space 105a in such a manner that the front case 101 is configured to have a hooking portion, and a non-exposure area that is covered by the hooking portion.

The fourth space 105d of the first internal space 105 is connected to the second space 106b of the second internal space 106, and the second space 105b of the first internal space 105 is connected to a first space 106a of the second internal space 106.

With reference to FIG. 9B, the second internal space 106 includes the first, second, third, and fourth spaces 106a, 106b, 106c, and 106d. The first space 106a is formed in such a manner that the base portion 621a on which the circuit substrate 623 and the dome key portion 624 are mounted stably reaches into it. A center area of the first space 106a is connected to the third space 105c of the first internal space 105. Accordingly, due to an external force that is applied to the first unit 610, the dome key portion 624 of the second unit 620 is pressed.

Water that is introduced into the first internal space 105 is blocked by the key brocket 612 and the lever portion 613 from flowing into the second internal space 106.

The second space 106b is connected to the fourth space 105d of the first internal space 105. The second fixation portion 621c is inserted into the second space 106b. That is, the second fixation portion 621c of the second unit 620 the fixation protrusion 611b of the first unit 610 are arranged to face each other. However, the second fixation portion 621c and the fixation protrusion 611b are arranged at a distance away from each other. Accordingly, due to the external force, the fixation protrusion 611b can move a specific distance d in the inward direction.

Water that is introduced through the fourth space 105d in which the fixation protrusion 611b is positioned is blocked by the O-ring 622 surrounding the second fixation portion 623 from being introduced into the second internal space 106.

The third space 106c is formed on each of the both end portions of the first space 106a. The third space 106c is made up of an exposure area and a non-exposure that is covered by the second hooking portion 101b. The third fixation portion 621d is mounted into the third space 106c.

Figure 10A:
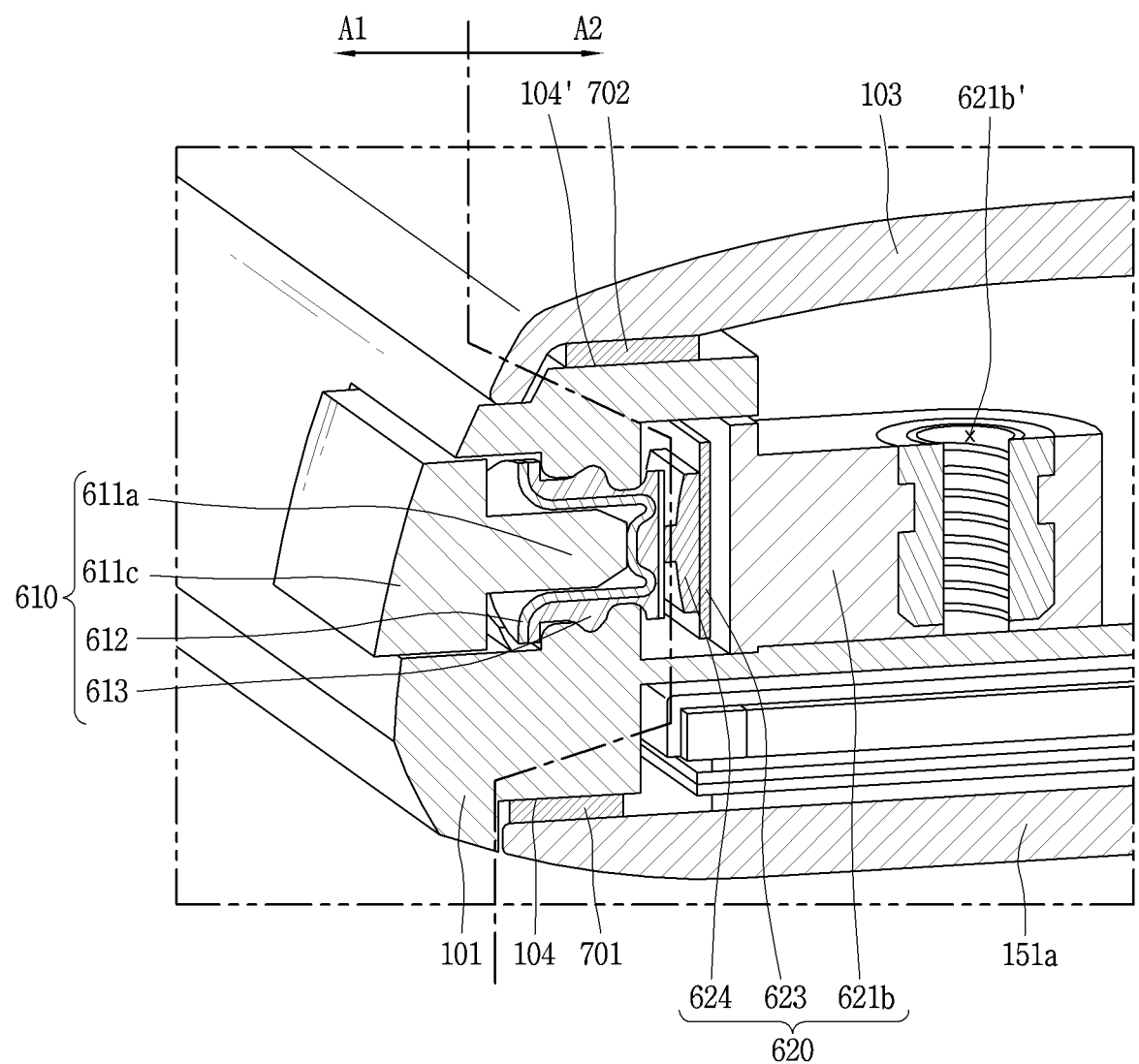
FIG. 10A is a cross-sectional diagram taken along line B-B in FIG. 8A.
Figure 10B:
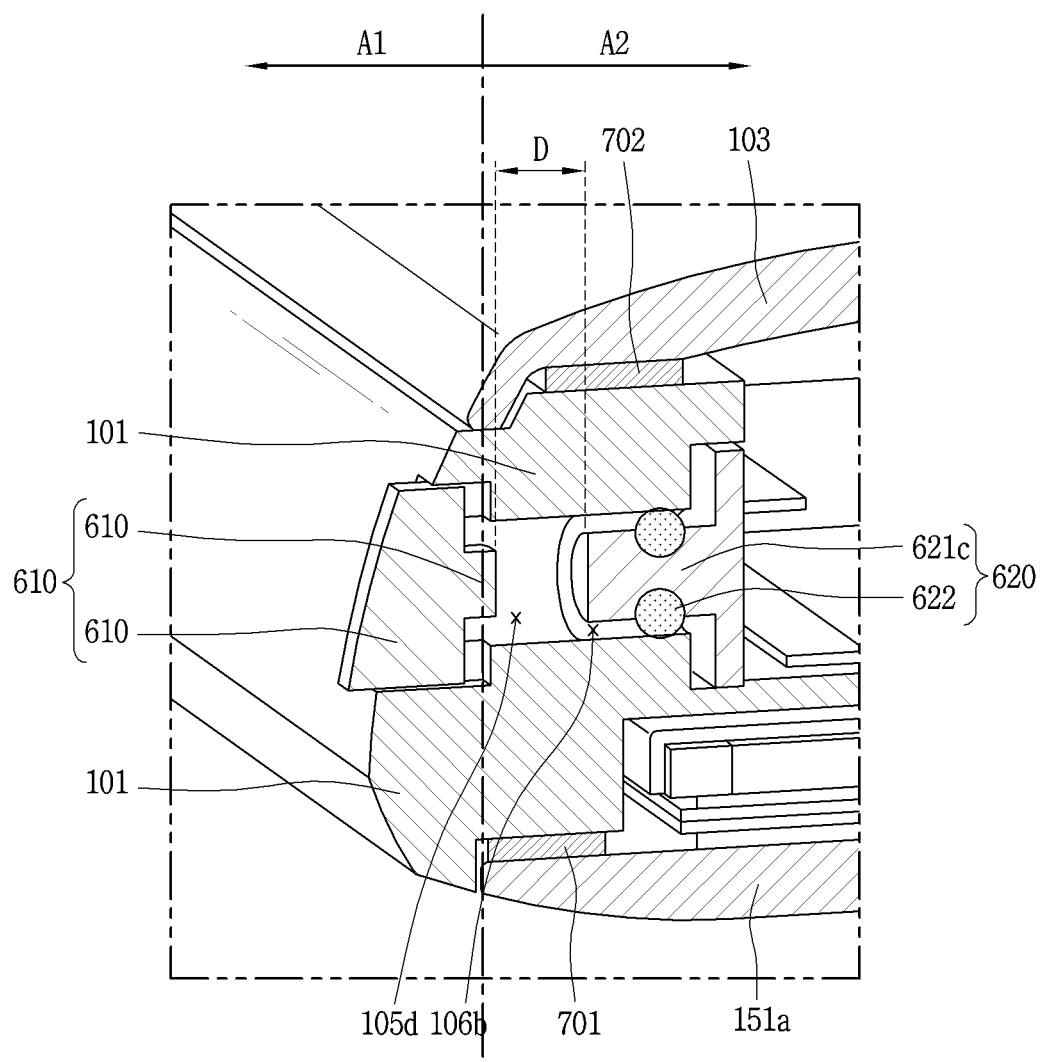
FIG. 10B is a cross-sectional diagram taken along line C-C in FIG. 8A.

FIG. 10A is a cross-sectional diagram taken along line B-B in FIG. 8A. FIG. 10B is a cross-sectional diagram taken along line C-C in FIG. 8A.

Figure 8B:
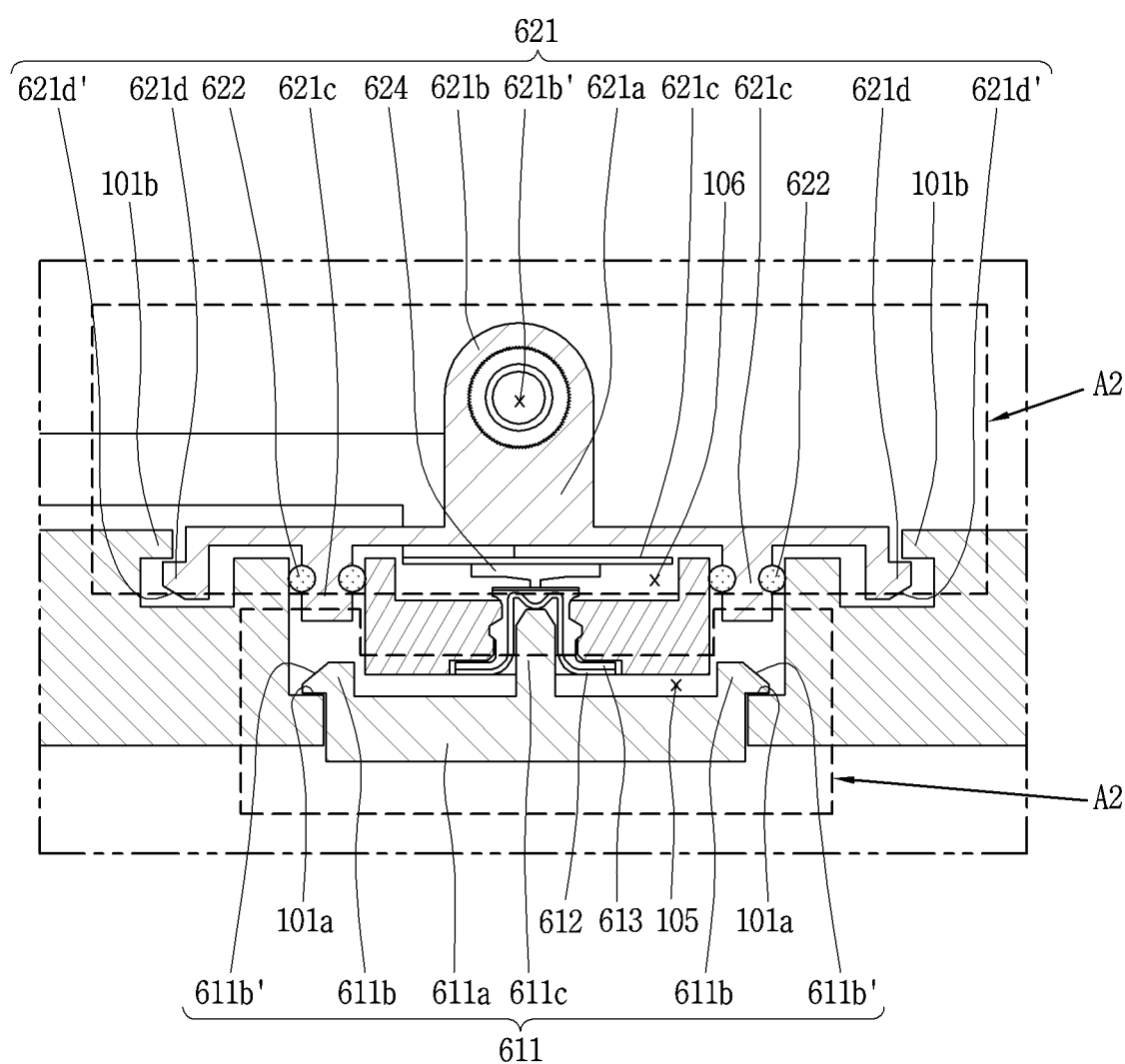
FIG. 8B is a cross-sectional diagram taken along line A-A in FIG. 8A.

With reference to FIGS. 8B and 10A, the first unit 610 passes through. The body portion 611a of the first unit 610 is movably mounted on the front case 101, and thus a gap is formed between the body portion 611a and the front case 101.

With the key bracket 612 surrounding the pressing protrusion 611c, and the lever portion 613, water that is introduced from the gap cannot flow in the direction of the second unit 620.

On the other hand, the window 151a and the rear surface cover 103 are mounted on both surfaces, respectively, of the front case 101. The front case 101 includes the stable-reaching surfaces 104 and 104' on which the window 151a and the rear surface 103, respectively, are mounted. First and second adhesion members 701 and 702 for attaching the window 151a and the rear surface cover 103 are formed on the stable-reaching surfaces 104 and 104', respectively. The first and second adhesion members 701 and 702 are made of waterproof material that blocks water from being introduced. Accordingly, the submergence area A1 and the waterproof area A2 are formed with respect to the first and second adhesion members 701 and 702.

On the other hand, the first fixation portion 621b of the second unit 620 includes the fastening hole 621b' that is formed in the thickness direction of the front case 101. A fastening bolt is inserted into the fastening hole 621b'. The fastening hole 621b' may be internally threaded. With the fastening bolt, the first fastening portion 621b is fastened to the front case 101, and thus the first unit 610 moves and presses the second unit 620. Although this is done, the second unit 620 can be prevented from being separated or being moved.

With reference to FIGS. 8A and 10B, the fourth area 105d of the first internal space 105, and the second area 106b of the second internal space 106 are connected to each other. The fixation protrusion 611b is inserted into the fourth area 105d, and the second fixation portion 621c on which the O-ring 622 is mounted is inserted into the second area 106b. An end portion of the fixation protrusion 611b and an end portion of the second fixation portion 621c are arranged at a distance away from each other, and thus such a distance d as is necessary for the fixation protrusion 611b to move can be secured.

With the first and second adhesion members 701 and 702, the window 151a and the rear surface cover 103 are attached to the front case 101. The body portion 611a is coupled to the front case 101 in such a manner that due to an external force, the first internal space 105 possibly moves into the first internal space 105. Accordingly, water can be introduced into the first internal space 105. With the first and second adhesion members 701 and 702 and the O-ring 622, water is blocked from flowing. Thus, the submergence area A1 and the waterproof area A2.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

INDUSTRIAL AVAILABILITY

The present invention relates to a waterproof watch-type terminal that includes a key module, and can find application in various industrial fields.

The invention claimed is:
1. A mobile terminal comprising:
a terminal main body that includes
a front case which forms an internal area that includes a submergence area into which water is introduced and a waterproof area into which water is blocked from being introduced, and
an internal frame;
a first unit that includes a key module which is mounted in the terminal main body and, when pressing occurs, generates a control command, the key module being positioned in the submergence area and moving due to an external force;
a second unit that is positioned in the waterproof area and, when the pressing occurs, generates a signal;
an elastic deformation layer of which a portion is elastically deformed due to movement of the first unit, in such a manner that the second unit is pressed by the first unit; and
a waterproof layer that attaches the elastic deformation layer and the front case in such a manner that partitioning results in the submergence area and the waterproof area, and that includes a through hole through which the first unit passes,
wherein the elastic deformation layer includes:
a first sheet that is adhered to the waterproof layer, and
a second sheet that is elastically deformed and is made of a material which is different from that of the first sheet, wherein the elastic deformation layer includes a groove which is formed in an area adjacent to an area that is brought into contact with the first unit, in such a manner that deformation occurs due to movement of the first unit, wherein the groove is recessed from a surface of the elastic deformation layer not being attached to the waterproof layer, and wherein a thickness of a portion in the vicinity of the groove of the elastic deformation layer is decreased due to the groove.

2. The mobile terminal according to claim 1, wherein the second unit includes a bracket that is fixed to the front case, and a circuit substrate that is mounted on the bracket and includes a dome key.

3. The mobile terminal according to claim 2, wherein the first unit is mounted on an external surface of the front case on which a rear surface cover is mounted, wherein the waterproof layer and the elastic deformation layer are mounted on an internal surface of the front case, and wherein the second unit is mounted on the internal surface of the front case in such a manner that as to cover the elastic deformation layer.

4. The mobile terminal according to claim 1, further comprising:

a first waterproof member that is positioned between the front case and the internal frame and is formed in an area adjacent to the waterproof in such a manner that water is prevented from being introduced.

5. The mobile terminal according to claim 4, further comprising:

a display unit that is mounted on the front case;

a rear surface cover that is formed to cover the internal frame and is coupled to the front case;

a second waterproof member that forms a waterproof area between the display unit and the front case; and a third waterproof member that forms the waterproof area between the internal frame and the rear surface cover.

6. The mobile terminal according to claim 1, wherein the first unit includes:

a metal key that is exposed to the outside of the terminal main body and is made of metal material;

a fixation lever that is mounted on an internal surface of the metal key; and a key bracket that includes a pressing portion which protrudes toward the inside of the terminal main body.

7. The mobile terminal according to claim 6, wherein the key bracket is mounted on the front case, and wherein the pressing portion is formed to pass through a portion of the key bracket.

8. The mobile terminal according to claim 7, further comprising:

an internal frame that is mounted on the front case and supports at least one electronic component; and a rear surface cover that covers the internal frame, is coupled to the front case, and includes a key hole, wherein the fixation lever to which the metal key is fixed is mounted on the rear surface cover in such a manner that the metal key passes through the key hole.

9. The mobile terminal according to claim 7, wherein the metal key, the fixation lever, and the key bracket are mounted on the front case, and wherein the pressing portion passes through the front case and is brought into contact with the elastic deformation layer.

* * * * *